(12) United States Patent
Ebisawa

(10) Patent No.: US 6,449,422 B1
(45) Date of Patent: Sep. 10, 2002

(54) EDITOR, EDITING SYSTEM, AND EDITING METHOD

(75) Inventor: Kan Ebisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/117,004

(22) PCT Filed: Nov. 21, 1997

(86) PCT No.: PCT/JP97/04250

§ 371 (c)(1),
(2), (4) Date: Jul. 20, 1998

(87) PCT Pub. No.: WO98/23089

PCT Pub. Date: May 28, 1998

(30) Foreign Application Priority Data

Nov. 22, 1996 (JP) ............................................. 8-325876

(51) Int. Cl.⁷ ............................. G11B 27/00; H04N 5/93
(52) U.S. Cl. ............................................ 386/52; 386/55
(58) Field of Search ............................. 386/52, 55, 46, 386/1, 4, 59, 60, 69; 360/13, 32; G11B 27/00; H04N 5/93

(56) References Cited

U.S. PATENT DOCUMENTS 5,568,275 A * 10/1996 Norton et al.
5,621,536 A * 4/1997 Kizu

FOREIGN PATENT DOCUMENTS

| JP | 63-123285 | 5/1988 |
| JP | 5-198141 | 8/1993 |
| JP | 5-314728 | 11/1996 |

* cited by examiner

Primary Examiner—Robert Chevalier
(74) Attorney, Agent, or Firm—Frommer Lawrence & Haug LLP; William S. Frommer; Dennis M. Smid

(57) ABSTRACT

An editing apparatus preferable for editing recorded video data for broadcasting is so constructed to realize the most preferable edition thereof corresponding to an importance degree of a recorded content broadcasting time. Importance degree value information and time code are held corresponding to an input of the importance degree at every scene. Based on edit list information generated according to the importance degree value and time information, time portions to be reproduced are selected from video data recorded in a recording medium and, then reproduced and outputted by a video data record reproduction means as a broadcasting video data.

20 Claims, 25 Drawing Sheets

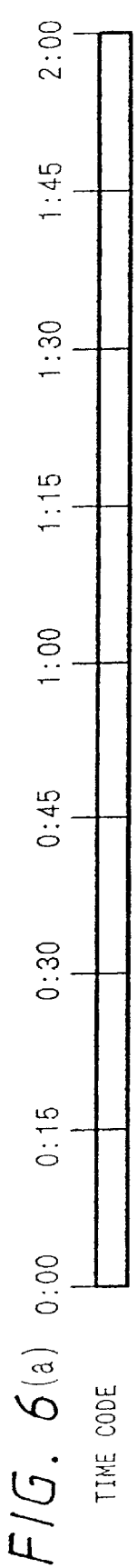
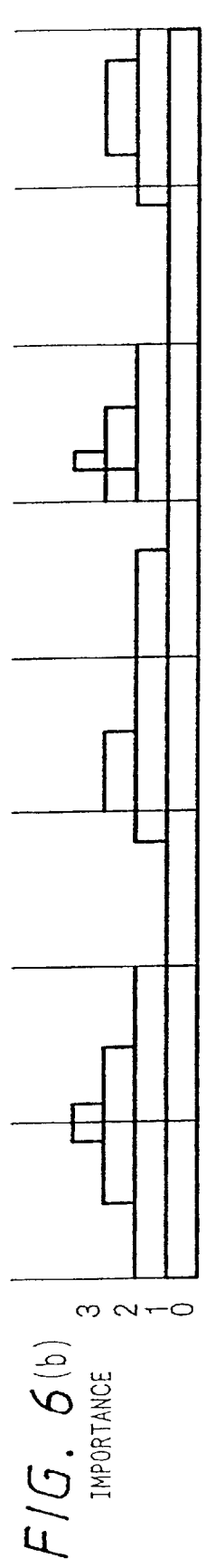
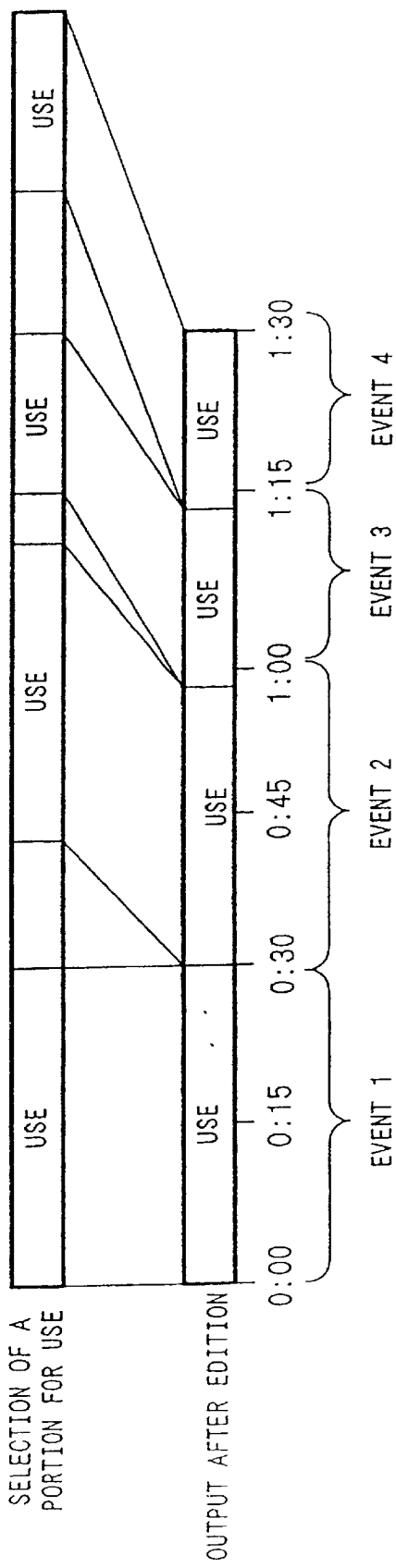
FIG. 6(a) TIME CODE
FIG. 6(b) IMPORTANCE
FIG. 6(c) SELECTION OF A PORTION FOR USE / OUTPUT AFTER EDITION

FIG. 7

SWITCH LEVEL LIST

| INDEX NO. | TIME CODE | SWITCH LEVEL |
|---|---|---|
| 1 | 00:00:00:00 | 1 |
| 2 | 00:07:22:05 | 2 |
| 3 | 00:13:14:11 | 3 |
| 4 | 00:16:45:02 | 2 |
| 5 | 00:22:02:10 | 1 |
| 6 | 00:29:45:19 | 0 |
| 7 | 00:42:15:13 | 1 |
| 8 | 00:45:00:26 | 2 |
| 9 | 00:53:02:00 | 1 |
| 10 | 01:09:42:06 | 0 |
| 11 | 01:16:20:20 | 3 |
| 12 | 01:17:42:15 | 2 |
| 13 | 01:24:56:19 | 1 |
| 14 | 01:30:12:03 | 0 |
| 15 | 01:43:55:09 | 1 |
| 16 | 01:48:02:24 | 2 |
| 17 | 01:56:12:04 | 1 |
| 18 | 02:00:00:00 | F |

FIG. 8

EDIT LIST

| TIME CODE | EDIT LEVEL | EDIT LIST | ON AIR TIME | OFF TIME | |
|---|---|---|---|---|---|
| 00:00:00:00 | 1 | -00:00:00:00- | -00:00:00:00- | -00:00:00:00- | |
| 00:30:00:00 | 0 | on air | 00:30:00:00 | 00:00:00:00 | ( EVENT 1 ) |
| 00:42:00:00 | 1 | | 00:30:00:00 | 00:12:00:00 | |
| 01:10:00:00 | 0 | on air | 00:58:00:00 | 00:12:00:00 | ( EVENT 2 ) |
| 01:14:30:00 | 1 | | 01:13:45:00 | 00:16:30:00 | |
| 01:30:15:00 | 0 | on air | 01:13:45:00 | 00:16:30:00 | ( EVENT 3 ) |
| 01:43:45:00 | 1 | | 01:30:00:00 | 00:30:00:00 | |
| 02:00:00:00 | F | on air | 01:30:00:00 | 00:30:00:00 | ( EVENT 4 ) |

EDIT LEVEL LIST

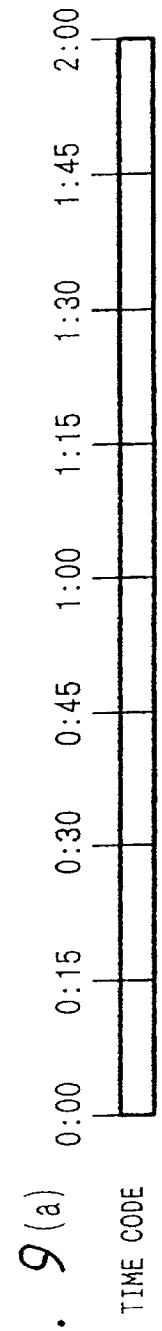
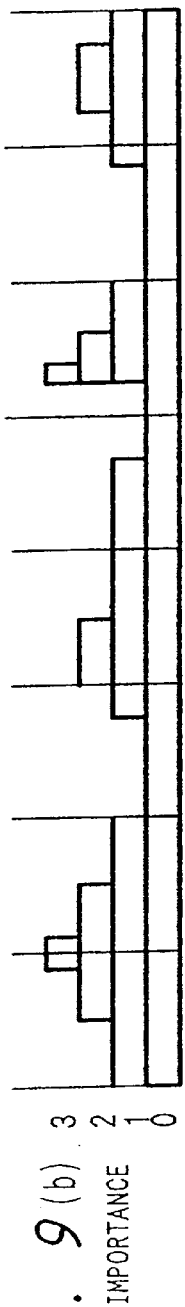
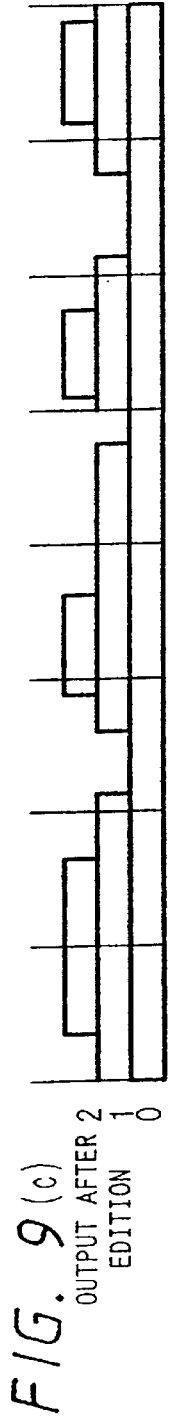
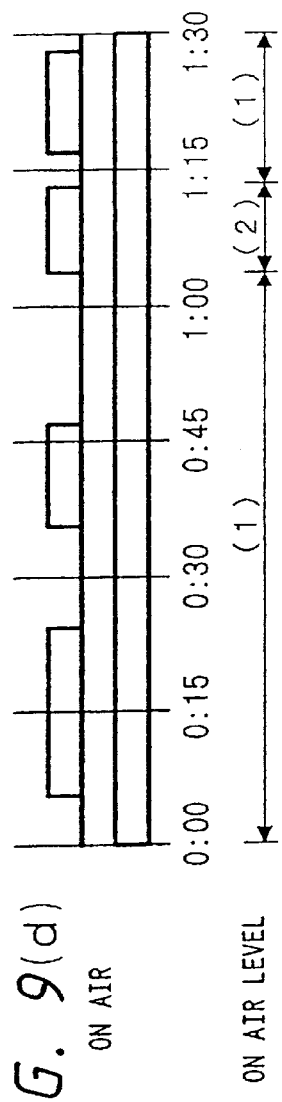
FIG. 9(a) TIME CODE
FIG. 9(b) IMPORTANCE
FIG. 9(c) OUTPUT AFTER EDITION
FIG. 9(d) ON AIR

FIG. 10(a)

SWITCH LEVEL LIST

| INDEX NO. | TIME CODE | SWITCH LEVEL |
|---|---|---|
| 1 | 00:00:00:00 | 1 |
| 2 | 00:07:22:05 | 2 |
| 3 | 00:13:14:11 | 3 |
| 4 | 00:16:45:02 | 2 |
| 5 | 00:22:02:10 | 1 |
| 6 | 00:29:45:19 | 0 |
| 7 | 00:42:15:13 | 1 |
| 8 | 00:45:00:26 | 2 |
| 9 | 00:53:02:00 | 1 |
| 10 | 01:09:42:06 | 0 |
| 11 | 01:16:20:20 | 3 |
| 12 | 01:17:42:15 | 2 |
| 13 | 01:24:56:19 | 1 |
| 14 | 01:30:12:03 | 0 |
| 15 | 01:43:55:09 | 1 |
| 16 | 01:48:02:24 | 2 |
| 17 | 01:56:12:04 | 1 |
| 18 | 02:00:00:00 | F |

FIG. 10(b)

EDIT LEVEL LIST

| INDEX NO. | TIME CODE | EDIT LEVEL |
|---|---|---|
| 1 | 00:00:00:00 | 1 |
| 2 | 00:05:00:00 | 2 |
| 3 | 00:24:00:00 | 1 |
| 4 | 00:31:30:00 | 0 |
| 5 | 00:40:30:00 | 1 |
| 6 | 00:43:00:00 | 2 |
| 7 | 00:55:00:00 | 1 |
| 8 | 01:11:00:00 | 0 |
| 9 | 01:15:00:00 | 1 |
| 10 | 01:16:00:00 | 2 |
| 11 | 01:26:30:00 | 1 |
| 12 | 01:31:30:00 | 0 |
| 13 | 00:42:00:00 | 1 |
| 14 | 01:46:30:00 | 2 |
| 15 | 01:58:00:00 | 1 |
| 16 | 02:00:00:00 | F |

FIG. 11

EDIT LIST

| TIME CODE | EDIT LEVEL | ON AIR LEVEL | EDIT LIST | ON AIR TIME | OFF TIME |
|---|---|---|---|---|---|
| 00:00:00:00 | 1 | 1 | -00:00:00:00- | -00:00:00:00- | -00:00:00:00- |
| 00:05:00:00 | 2 | 1 | on air | 00:00:00:00 | 00:00:00:00 |
| 00:24:00:00 | 1 | 1 | on air | 00:05:00:00 | 00:00:00:00 |
| 00:31:30:00 | 0 | 1 | on air | 00:24:00:00 | 00:00:00:00 |
| 00:40:30:00 | 1 | 1 | | 00:31:30:00 | 00:09:00:00 |
| 00:43:00:00 | 2 | 1 | on air | 00:34:00:00 | 00:09:00:00 |
| 00:55:00:00 | 1 | 1 | on air | 00:46:00:00 | 00:09:00:00 |
| 01:11:00:00 | 0 | 1 | on air | 01:02:00:00 | 00:09:00:00 |
| 01:15:00:00 | 1 | 1 | | 01:02:00:00 | 00:13:00:00 |
| 01:16:00:00 | 2 | 1 | on air | 01:03:00:00 | 00:13:00:00 |
| 01:26:30:00 | 1 | 1 | on air | 01:18:30:00 | 00:13:00:00 |
| 01:31:30:00 | 0 | 1 | on air | 01:18:30:00 | 00:13:00:00 |
| 01:42:00:00 | 1 | 1 | on air | 01:22:60:00 | 00:23:70:00 |
| 01:46:30:00 | 2 | 1 | on air | 01:34:30:00 | 00:23:70:00 |
| 01:58:00:00 | 1 | .1 | on air | 01:36:30:00 | 00:23:70:00 |
| 02:00:00:00 | F | F | | 01:30:00:00 | 00:30:00:00 |

EDIT LEVEL LIST

FIG. 12

EDIT LIST

| TIME CODE | EDIT LEVEL | ON AIR LEVEL | EDIT LIST | ON AIR TIME | OFF TIME |
|---|---|---|---|---|---|
| 00:00:00:00 | 1 | 1 | -00:00:00:00- | -00:00:00:00- | -00:00:00:00- |
| 00:05:00:00 | 2 | 1 | on air | 00:05:00:00 | 00:00:00:00 |
| 00:24:00:00 | 1 | 1 | on air | 00:24:00:00 | 00:00:00:00 |
| 00:31:30:00 | 0 | 1 | on air | 00:31:30:00 | 00:00:00:00 |
| 00:40:30:00 | 1 | 1 | | 00:31:30:00 | 00:09:00:00 |
| 00:43:00:00 | 2 | 1 | on air | 00:34:00:00 | 00:09:00:00 |
| 00:55:00:00 | 1 | 1 | on air | 00:46:00:00 | 00:09:00:00 |
| 01:11:00:00 | 0 | 1 | on air | 01:02:00:00 | 00:09:00:00 |
| 01:15:00:00 | 1 | 2 | | 01:02:00:00 | 00:13:00:00 |
| 01:16:00:00 | 2 | 2 | | 01:02:00:00 | 00:14:00:00 |
| 01:26:30:00 | 1 | 2 | on air | 01:12:30:00 | 00:14:00:00 |
| 01:31:30:00 | 0 | 2 | | 01:12:30:00 | 00:19:00:00 |
| 01:42:00:00 | 1 | 2 | | 01:12:30:00 | 00:29:70:00 |
| 01:42:30:00 | 2 | 1 | | 01:12:30:00 | 00:30:70:00 |
| 01:46:30:00 | 1 | 1 | on air | 01:16:30:00 | 00:30:70:00 |
| 01:58:00:00 | 1 | 1 | on air | 01:28:00:00 | 00:30:70:00 |
| 02:00:00:00 | F | F | on air | 01:30:00:00 | 00:30:70:00 |
| | | | | 01:30:00:00 | 00:30:00:00 |

EDIT LEVEL LIST

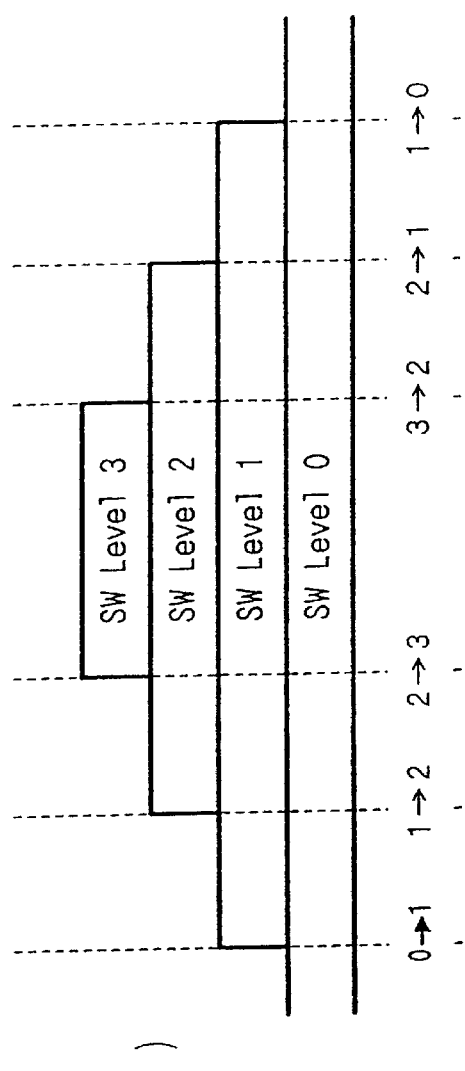
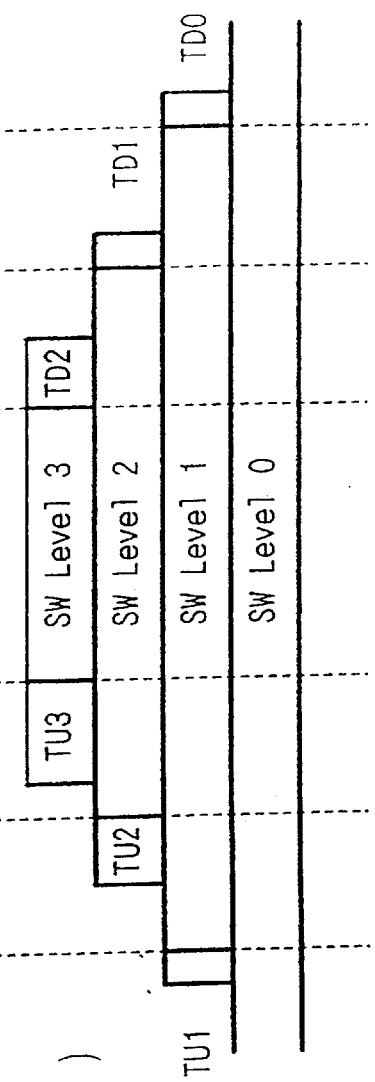
FIG. 13(a) SWITCH LEVEL
FIG. 13(b) EDIT LEVEL

FIG. 15 (a)

SWITCH LEVEL LIST

| INDEX NO. | TIME CODE | SWITCH LEVEL |
|---|---|---|
| 1 | 00:00:00:00 | 1 |
| 2 | 00:07:22:05 | 2 |
| 3 | 00:13:14:11 | 3 |
| 4 | 00:16:45:02 | 2 |
| 5 | 00:22:02:10 | 1 |
| 6 | 00:29:45:19 | 0 |
| 7 | 00:42:15:13 | 1 |
| 8 | 00:45:00:26 | 2 |
| 9 | 00:53:02:00 | 1 |
| 10 | 01:09:42:06 | 0 |
| 11 | 01:16:20:20 | 3 |
| 12 | 01:17:42:15 | 2 |
| 13 | 01:24:56:19 | 1 |
| 14 | 01:30:12:03 | 0 |
| 15 | 01:43:55:09 | 1 |
| 16 | 01:48:02:24 | 2 |
| 17 | 01:56:12:04 | 1 |
| 18 | 02:00:00:00 | F |

FIG. 15 (b)

EDIT LEVEL LIST

| | TIME CODE | EDIT LEVEL |
|---|---|---|
| start | 00:00:00:00 | 1 |
| up | 00:06:22:05 | 2 |
| up | 00:11:14:11 | 3 |
| down | 00:17:45:02 | 2 |
| down | 00:22:32:10 | 1 |
| down | 00:30:00:19 | 0 |
| up | 00:41:45:13 | 1 |
| up | 00:44:00:26 | 2 |
| down | 00:53:32:00 | 1 |
| down | 01:09:57:06 | 0 |
| up | 01:14:20:20 | 3 |
| down | 01:18:42:15 | 2 |
| down | 01:25:56:19 | 1 |
| down | 01:30:27:03 | 0 |
| up | 01:43:25:09 | 1 |
| up | 01:47:02:24 | 2 |
| down | 01:56:42:04 | 1 |
| end | 02:00:00:00 | F |

FIG. 16

EDIT LEVEL LIST

| EDIT INDEX NO. | TIME CODE | EDIT LEVEL | CHECK LIST LEVEL 0 | CHECK LIST LEVEL 1 | CHECK LIST LEVEL 2 | ON AIR LEVEL | EDIT LIST | ON AIR TIME | OFF TIME |
|---|---|---|---|---|---|---|---|---|---|
| 1 | 00:00:00:00 | 1 | 00:05:00:00 | 00:05:00:00 | 00:05:00:00 | 1 | on air | 00:00:00:00– | –00:00:00:00– |
| 2 | 00:05:00:00 | 2 | 00:24:00:00 | 00:24:00:00 | 00:19:00:00 | 1 | on air | 00:05:00:00 | 00:00:00:00 |
| 3 | 00:24:00:00 | 1 | 00:31:30:00 | 00:31:30:00 | 00:19:00:00 | 1 | on air | 00:24:00:00 | 00:00:00:00 |
| 4 | 00:31:30:00 | 0 | 00:40:30:00 | 00:31:30:00 | 00:19:00:00 | 1 | | 00:31:30:00 | 00:00:00:00 |
| 5 | 00:40:30:00 | 1 | 00:43:00:00 | 00:34:00:00 | 00:19:00:00 | 2 | | 00:31:30:00 | 00:09:00:00 |
| 6 | 00:43:00:00 | 2 | 00:55:00:00 | 00:46:00:00 | 00:31:00:00 | 2 | on air | 00:31:30:00 | 00:11:30:00 |
| 7 | 00:55:00:00 | 1 | 01:11:00:00 | 01:02:00:00 | 00:31:00:00 | 1 | | 00:43:30:00 | 00:11:30:00 |
| 8 | 01:11:00:00 | 0 | 01:15:00:00 | 01:02:00:00 | 00:31:00:00 | 1 | | 00:43:30:00 | 00:27:30:00 |
| 9 | 01:15:00:00 | 1 | 01:16:00:00 | 01:03:00:00 | 00:31:00:00 | 1 | on air | 00:44:30:00 | 00:31:30:00 |
| 10 | 01:16:00:00 | 2 | 01:26:30:00 | 01:13:00:00 | 00:41:30:00 | 1 | on air | 00:55:00:00 | 00:31:30:00 |
| 11 | 01:26:30:00 | 1 | 01:31:30:00 | 01:18:30:00 | 00:41:30:00 | 1 | | 01:00:00:00 | 00:31:30:00 |
| 12 | 01:31:30:00 | 0 | 01:42:00:00 | 01:18:30:00 | 00:41:30:00 | 1 | | 01:00:00:00 | 00:42:00:00 |
| 13 | 01:42:00:00 | 1 | 01:46:30:00 | 01:22:60:00 | 00:41:30:00 | 1 | on air | 01:04:30:00 | 00:42:00:00 |
| 14 | 01:46:30:00 | 2 | 01:58:00:00 | 01:34:30:00 | 00:53:00:00 | 1 | on air | 01:16:00:00 | 00:42:00:00 |
| 15 | 01:58:00:00 | 1 | 02:00:00:00 | 01:36:30:00 | 00:53:00:00 | 1 | on air | 01:18:00:00 | 00:42:00:00 |
| 16 | 02:00:00:00 | F | 01:30:00:00 | 01:30:00:00 | 01:30:00:00 | F | | 01:30:00:00 | 00:30:00:00 |

ACCUMULATED TIME WHEN ON AIR LEVEL IS 0.
ACCUMULATED TIME WHEN ON AIR LEVEL IS 1.
ACCUMULATED TIME WHEN ON AIR LEVEL IS 2.

FIG. 17

EDIT LIST

| EDIT INDEX NO. | TIME CODE | EDIT LEVEL | CHECK LIST | | | EDIT LIST | ON AIR LEVEL | ON AIR TIME | OFF TIME |
|---|---|---|---|---|---|---|---|---|---|
| | | | LEVEL 0 | LEVEL 1 | LEVEL 2 | | | | |
| | | | | | | -00:00:00:00- | | -00:00:00:00- | -00:00:00:00- |
| 1 | 00:00:00:00 | 1 | 00:05:00:00 | 00:05:00:00 | 00:00:00:00 | on air | 1 | 00:05:00:00 | 00:00:00:00 |
| 2 | 00:05:00:00 | 2 | 00:24:00:00 | 00:24:00:00 | 00:19:00:00 | on air | 1 | 00:24:00:00 | 00:00:00:00 |
| 3 | 00:24:00:00 | 1 | 00:31:30:00 | 00:31:30:00 | 00:19:00:00 | on air | 1 | 00:31:30:00 | 00:00:00:00 |
| 4 | 00:31:30:00 | 0 | 00:40:30:00 | 00:31:30:00 | 00:19:00:00 | | 1 | 00:31:30:00 | 00:09:00:00 |
| 5 | 00:40:30:00 | 1 | 00:43:00:00 | 00:34:00:00 | 00:19:00:00 | | 1 | 00:31:30:00 | 00:11:30:00 |
| 6 | 00:43:00:00 | 2 | 00:55:00:00 | 00:46:00:00 | 00:31:00:00 | on air | 2 | 00:43:30:00 | 00:11:30:00 |
| 7 | 00:55:00:00 | 1 | 01:11:00:00 | 01:02:00:00 | 00:31:00:00 | | 2 | 00:55:30:00 | 00:15:30:00 |
| 8 | 01:11:00:00 | 0 | 01:15:00:00 | 01:02:00:00 | 00:31:00:00 | E:01:07:00:00 | 1 | 00:55:30:00 | 00:19:30:00 |
| 9 | 01:15:00:00 | 1 | 01:16:00:00 | 01:03:00:00 | 00:31:00:00 | on air | 1 | 00:56:30:00 | 00:19:30:00 |
| 10 | 01:16:00:00 | 2 | 01:26:30:00 | 01:13:30:00 | 00:41:30:00 | on air | 1 | 01:07:00:00 | 00:19:30:00 |
| 11 | 01:26:30:00 | 0 | 01:31:30:00 | 01:18:30:00 | 00:41:30:00 | | 1 | 01:12:00:00 | 00:19:30:00 |
| 12 | 01:31:30:00 | 1 | 01:42:00:00 | 01:18:30:00 | 00:41:30:00 | on air | 1 | 01:12:00:00 | 00:30:00:00 |
| 13 | 01:42:00:00 | 1 | 01:46:30:00 | 01:22:60:00 | 00:41:30:00 | on air | 1 | 01:16:30:00 | 00:30:00:00 |
| 14 | 01:46:30:00 | 2 | 01:58:00:00 | 01:34:30:00 | 00:53:00:00 | on air | 1 | 01:28:00:00 | 00:30:00:00 |
| 15 | 01:58:00:00 | 1 | 02:00:00:00 | 01:36:30:00 | 00:53:00:00 | on air | 1 | 01:30:00:00 | 00:30:00:00 |
| 16 | 02:00:00:00 | F | 01:30:00:00 | 01:30:00:00 | 01:30:00:00 | | F | 01:30:00:00 | 00:30:00:00 |

EDIT LEVEL LIST

FIG. 18

EDIT LIST

| EDIT INDEX NO. | TIME CODE | EDIT LEVEL | CHECK LIST | | | ON AIR LEVEL | EDIT LIST | ON AIR TIME | OFF TIME |
|---|---|---|---|---|---|---|---|---|---|
| | | | LEVEL 0 | LEVEL 1 | LEVEL 2 | | -00:00:00:00- | -00:00:00:00- | -00:00:00:00- |
| 1 | 00:00:00:00 | 1 | 00:05:00:00 | 00:05:00:00 | 00:00:00:00 | 1 | on air | 00:05:00:00 | 00:00:00:00 |
| 2 | 00:05:00:00 | 2 | 00:24:00:00 | 00:24:00:00 | 00:19:00:00 | 1 | on air | 00:24:00:00 | 00:00:00:00 |
| 3 | 00:24:00:00 | 1 | 00:31:30:00 | 00:31:30:00 | 00:19:00:00 | 1 | on air | 00:31:30:00 | 00:00:00:00 |
| 4 | 00:31:30:00 | 0 | 00:40:30:00 | 00:31:30:00 | 00:19:00:00 | 1 | | 00:31:30:00 | 00:09:00:00 |
| 5 | 00:40:30:00 | 1 | 00:43:00:00 | 00:31:30:00 | 00:19:00:00 | 2 | | 00:31:30:00 | 00:11:30:00 |
| 6 | 00:43:00:00 | 2 | 00:55:00:00 | 00:34:00:00 | 00:19:00:00 | 2 | on air | 00:43:30:00 | 00:11:30:00 |
| 7 | 00:55:00:00 | 1 | 01:11:00:00 | 00:46:00:00 | 00:31:00:00 | R | S:00:59:00:00 | 00:55:30:00 | 00:15:30:00 |
| 8 | 01:11:00:00 | 0 | 01:15:00:00 | 01:02:00:00 | 00:31:00:00 | 1 | | 00:55:30:00 | 00:19:30:00 |
| 9 | 01:15:00:00 | 1 | 01:16:00:00 | 01:02:00:00 | 00:31:00:00 | 1 | on air | 00:56:30:00 | 00:19:30:00 |
| 10 | 01:16:00:00 | 2 | 01:26:30:00 | 01:03:00:00 | 00:31:00:00 | 1 | on air | 01:07:00:00 | 00:19:30:00 |
| 11 | 01:26:30:00 | 1 | 01:31:30:00 | 01:13:30:00 | 00:41:30:00 | 1 | on air | 01:12:00:00 | 00:19:30:00 |
| 12 | 01:31:30:00 | 0 | 01:42:00:00 | 01:18:30:00 | 00:41:30:00 | 1 | | 01:12:00:00 | 00:30:00:00 |
| 13 | 01:42:00:00 | 1 | 01:46:30:00 | 01:22:60:00 | 00:41:30:00 | 1 | on air | 01:16:30:00 | 00:30:00:00 |
| 14 | 01:46:30:00 | 2 | 01:58:00:00 | 01:34:30:00 | 00:53:00:00 | 1 | on air | 01:28:00:00 | 00:30:00:00 |
| 15 | 01:58:00:00 | 1 | 02:00:00:00 | 01:36:30:00 | 00:53:00:00 | 1 | on air | 01:30:00:00 | 00:30:00:00 |
| 16 | 02:00:00:00 | F | 01:30:00:00 | 01:30:00:00 | 01:30:00:00 | F | | 01:30:00:00 | 00:30:00:00 |

EDIT LEVEL LIST

FIG. 23

EDIT LIST

| EDIT INDEX NO. | TIME CODE | EDIT LEVEL | CHECK LIST | | | ON AIR LEVEL | EDIT LIST | ON AIR TIME | OFF TIME |
|---|---|---|---|---|---|---|---|---|---|
| | | | LEVEL 0 | LEVEL 1 | LEVEL 2 | | | | |
| 1 | 00:00:00:00 | 1 | 00:05:00:00 | 00:05:00:00 | 00:05:00:00 | 1 | -00:42:15:20- | -00:33:15:20- | -00:09:00:00- |
| 2 | 00:05:00:00 | 2 | 00:24:00:00 | 00:24:00:00 | 00:24:00:00 | 1 | on air | 00:05:00:00 | 00:00:00:00 |
| 3 | 00:24:00:00 | 1 | 00:31:30:00 | 00:31:30:00 | 00:31:30:00 | 1 | on air | 00:24:00:00 | 00:00:00:00 |
| 4 | 00:31:30:00 | 0 | 00:31:30:00 | 00:31:30:00 | 00:31:30:00 | | on air | 00:31:30:00 | 00:00:00:00 |
| 5 | 00:40:30:00 | 1 | 00:34:00:00 | 00:34:00:00 | 00:33:15:20 | 1 | on air | 00:31:30:00 | 00:09:00:00 |
| 6 | 00:43:00:00 | 2 | 00:46:00:00 | 00:46:00:00 | 00:45:15:20 | 1 | on air | 00:34:00:00 | 00:09:00:00 |
| 7 | 00:55:00:00 | 1 | 01:02:00:00 | 01:02:00:00 | 00:45:15:20 | 2 | on air | 00:46:00:00 | 00:09:00:00 |
| 8 | 01:11:00:00 | 0 | 01:06:00:00 | 01:02:00:00 | 00:45:15:20 | 1 | | 00:46:00:00 | 00:25:00:00 |
| 9 | 01:15:00:00 | 1 | 01:07:00:00 | 01:03:00:00 | 00:45:15:20 | 1 | | 00:46:00:00 | 00:29:00:00 |
| 10 | 01:16:00:00 | 2 | 01:17:30:00 | 01:13:30:00 | 00:95:45:20 | 1 | on air | 00:47:00:00 | 00:29:00:00 |
| 11 | 01:26:30:00 | 1 | 01:22:30:00 | 01:18:30:00 | 00:95:45:20 | 1 | on air | 00:97:30:00 | 00:29:00:00 |
| 12 | 01:31:30:00 | 0 | 01:33:00:00 | 01:18:30:00 | 00:95:45:20 | 1 | on air | 01:02:30:00 | 00:29:00:00 |
| 13 | 01:42:00:00 | 1 | 01:37:30:00 | 01:22:60:00 | 00:95:45:20 | 1 | | 01:02:30:00 | 00:39:70:00 |
| 14 | 01:46:30:00 | 2 | 01:49:00:00 | 01:34:30:00 | 01:07:15:20 | 1 | on air | 01:06:60:00 | 00:39:70:00 |
| 15 | 01:58:00:00 | 1 | 01:51:00:00 | 01:36:30:00 | 01:07:15:20 | 1 | on air | 01:18:30:00 | 00:39:70:00 |
| 16 | 02:00:00:00 | F | 01:30:00:00 | 01:30:00:00 | 01:30:00:00 | F | on air | 01:20:30:00 | 00:39:70:00 |
| | | | | | | | | 01:30:00:00 | 00:30:00:00 |

FIG. 24

EDIT LIST

| EDIT INDEX NO. | TIME CODE | EDIT LEVEL | CHECK LIST | | | ON AIR LEVEL | EDIT LIST | ON AIR TIME | OFF TIME |
|---|---|---|---|---|---|---|---|---|---|
| | | | LEVEL 0 | LEVEL 1 | LEVEL 2 | | | | |
| 1 | 00:00:00:00 | 1 | 00:05:00:00 | 00:05:00:00 | 00:05:00:00 | 1 | -00:42:15:20- | -00:33:15:20- | -00:09:00:00- |
| 2 | 00:05:00:00 | 2 | 00:24:00:00 | 00:24:00:00 | 00:24:00:00 | 1 | on air | 00:05:00:00 | 00:00:00:00 |
| 3 | 00:24:00:00 | 1 | 00:31:30:00 | 00:31:30:00 | 00:31:30:00 | 1 | on air | 00:24:00:00 | 00:00:00:00 |
| 4 | 00:31:30:00 | 0 | 00:31:30:00 | 00:31:30:00 | 00:31:30:00 | 1 | on air | 00:31:30:00 | 00:00:00:00 |
| 5 | 00:40:30:00 | 1 | 00:34:00:00 | 00:34:00:00 | 00:33:15:20 | 1 | on air | 00:34:00:00 | 00:09:00:00 |
| 6 | 00:43:00:00 | 2 | 00:46:00:00 | 00:46:00:00 | 00:45:15:20 | 1 | on air | 00:46:00:00 | 00:09:00:00 |
| 7 | 00:55:00:00 | 1 | 01:02:00:00 | 01:02:00:00 | 00:45:15:20 | R | S:01:01:30:00 | 00:55:30:00 | 00:15:30:00 |
| 8 | 01:11:00:00 | 0 | 01:06:00:00 | 01:03:00:00 | 00:45:15:20 | 1 | | 00:55:30:00 | 00:19:30:00 |
| 9 | 01:15:00:00 | 1 | 01:07:00:00 | 01:13:30:00 | 00:95:45:20 | 1 | on air | 00:56:30:00 | 00:19:30:00 |
| 10 | 01:16:00:00 | 2 | 01:17:30:00 | 01:18:30:00 | 00:95:45:20 | 1 | on air | 01:07:00:00 | 00:19:30:00 |
| 11 | 01:26:30:00 | 1 | 01:22:30:00 | 01:18:30:00 | 00:95:45:20 | 1 | on air | 01:12:00:00 | 00:19:30:00 |
| 12 | 01:31:30:00 | 0 | 01:33:00:00 | 01:22:60:00 | 00:95:45:20 | 1 | | 01:12:00:00 | 00:30:00:00 |
| 13 | 01:42:00:00 | 1 | 01:37:30:00 | 01:34:30:00 | 01:07:15:20 | 1 | on air | 00:16:30:00 | 00:30:00:00 |
| 14 | 01:46:30:00 | 2 | 01:49:00:00 | 01:36:30:00 | 01:07:15:20 | 1 | on air | 01:28:00:00 | 00:30:00:00 |
| 15 | 01:58:00:00 | 1 | 01:51:00:00 | 01:30:00:00 | 01:30:00:00 | 1 | on air | 01:30:00:00 | 00:30:00:00 |
| 16 | 02:00:00:00 | F | 01:30:00:00 | 01:30:00:00 | 01:30:00:00 | F | | 01:30:00:00 | 00:30:00:00 |

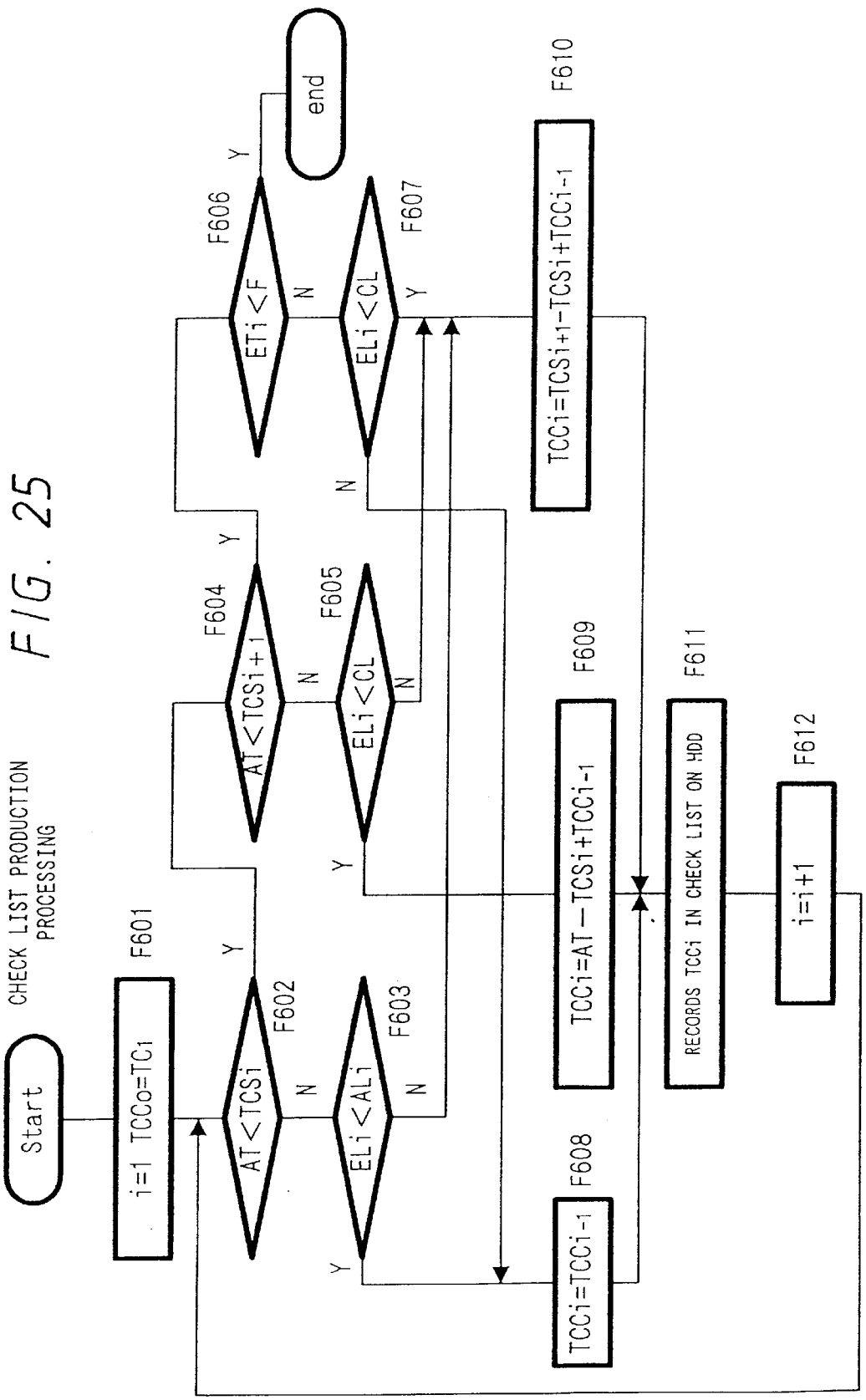

EDITOR, EDITING SYSTEM, AND EDITING METHOD

TECHNICAL FIELD

The present invention relates to an editing apparatus, editing system and editing method and more particularly to a technique suitable for editing real-time material such as sport events, news report and so on quickly for broadcasting.

BACKGROUND ART

In a television broadcasting, often a video-recorded program is put on the air by time shift during live broadcasting of sports event or the like. This is such a case in which, for example, by video recording a sport game started at 1:00 in the afternoon, it is put on the air from 2:00 in the afternoon. In such a time-shift video-recorded program broadcasting, sometimes, a broadcasting time is set shorter than a recording time for a game or the like. This is such a case in which, for example, a program of live recording for about two hours is put on the air as a program for an hour and half. Of course, the recording time often extends in a case of live broadcasting of sport game because the game is prolonged.

In such a recorded program broadcasting, its recorded content needs to be edited corresponding to a predetermined broadcasting time. Particularly in a case when a game scheduled for about two hours from 1:00 in the afternoon will be broadcast from 2:00 in the afternoon, the game is recorded on one hand and a recorded video content is edited on the other hand and put on the air.

However, it is impossible to estimate when an important scene to be broadcast appears in a case of live broadcasting of sports or new events. For example, in a case of video recording on one hand and then editing the recorded scene immediately and putting it on the air on the other hand, what important scene will come after that cannot be expected. Therefore, in such a case, it is very difficult to edit so that important scenes for broadcasting can be appropriately supplied to viewers with scenes before and after that. Further, from restrictions of broadcasting time, there may occur a case in which an important scene which occurs at an end portion of a game cannot be put on the air.

Further, in an ordinary recorded program broadcasting in which a recorded program is edited after an event and then broadcast, a work for selecting portions to be broadcast by checking each scene to see whether or not it is important is needed. A method for simplifying such an editing work itself has been demanded today.

DISCLOSURE OF THE INVENTION

Accordingly, in view of such an aspect, the present invention intends to provide an editing apparatus preferable for editing of recorded video data for broadcasting and particularly realize an edition (i.e. a broadcast) most preferable corresponding to an importance degree of recorded content depending on a broadcasting time.

Therefore, according to the present invention, as an editing apparatus, there are provided a time information generating means for generating time information of a source video data supplied continuously from an outside at real time and a video data record and reproduction means capable of recording the source video data in a recording medium together with the time information and reproducing and outputting video data recorded in the recording medium corresponding to a reproduction command are provided. That is, as source for video image to be broadcast, the means for recording the time information and video data are provided.

Further, there are provided an importance degree input means capable of inputting an importance degree value indicating an importance degree of the content of the source video data arbitrarily, and and an importance degree value recording means for recording the importance degree inputted by the importance degree input means in the recording medium together with the time information generated from the time information generating means. Namely, for video data to be recorded, as an operator inputs an importance degree of content of each scene at the recording time, information about the importance degree of each scene is held. For example, with time information such as time code or the like, such information as indicating that a scene from time code A to time code B has a high importance degree is accumulated.

Further, changing means capable of changing values of the importance degree value and/or time information recorded in the importance degree value recording means is also provided. Because the input of the importance degree by the aforementioned importance degree input means is carried out by the operator at real time, it is difficult to always set the importance degree values at appropriate timing. For example, if an important scene suddenly occurs, it is preferable to raise the importance degree of a scene just before the same also. To cope with such a case, it is so constructed that the importance degree value and/or time information can be changed by the changing means.

Further, the control means for editing and broadcasting the video data recorded in the recording medium in the above manner according to the importance degree value selects a time portion to be reproduced from video data recorded in the recording medium based on an edit list information generated corresponding to the importance degree value and time information recorded in the importance degree value recording means and makes the video data record and reproduction means to reproduce and output broadcasting video data.

Further, the changing means can change a value of time information corresponding to each importance degree value depending on a change of the importance degree value on a time axis. That is, an optimum change of important value is automatically carried out. For example, in a portion in which the importance degree rises, time information corresponding to that rising importance degree is changed to a value of time earlier by a predetermined time portion. That is, for an important scene, the importance degree of a scene just before is also raised.

Further, the control means generates an edit list information corresponding to the importance degree value and time information recorded in the importance degree value recording means and calculates an accumulation time of video data portions to be selected according to the importance degree values of the edit list information.

Particularly after reproduction of broadcasting video data from the recording medium by the video data record reproduction means is started or after broadcasting is started, the accumulation time is calculated according to the accumulation time of video data already reproduced and outputted and the accumulation time of the video data which will be selected based on the importance degree value of the edit list information but has not been reproduced and outputted. As a result, a non-edited portion can be edited optimally corresponding to remaining broadcasting time.

A selection standard to select a broadcasting video data based on the importance degree value of the edit list information for the control means can be set to an arbitrary value for each of any interval of the video data. Thus, a flexible edition can be carried out depending on broadcast time and the importance degree. Further, an accumulation time of video data portion to be selected based on the selection standard value and an importance degree of edit list information of each interval can be calculated.

Depending on the setting of a target accumulation time and setting of an interval to be corrected, the control means selects only a required time portion as broadcasting video data for that portion to be corrected. Therefore, precise editing corresponding to a broadcasting time is achieved.

BRIEF DESCRIPTION OF DRAWINGS

FIGS. 6 and 9 are respectively diagrams used for explaining editing action;

FIG. 7 is a diagram used for explaining a switch level list;

FIGS. 8 and 11 are diagrams used for explaining an edit list respectively;

FIGS. 10 and 15 are respectively diagrams used for explaining the switch level list and edit level list;

FIG. 12 is a diagram used for explaining an edit list in which the on air level has been changed;

FIG. 13 is a diagram used for explaining edit level automatic updating processing;

FIGS. 16, 17 and 18 are respectively diagrams used for explaining an edit list automatically produced;

FIGS. 23 and 24 are respectively diagrams used for explaining an edit list automatically produced after broadcasting is started; and FIG. 25 is a flow chart of check list automatic production processing after broadcasting is started.

BEST MODE FOR CARRYING OUT THE INVENTION

Hereinafter, an embodiment of the editing apparatus of the present invention will be described. The description will be carried out in the following order.
<1. Example of Structure of the Editing Apparatus>
<2. Example of a Structure of Screen of the Editing Apparatus>
<3. Switch Level Processing Upon Recording>
<4. Example of Manual Editing Action 1>
<5. Example of Manual Editing Action 2>
<6. Example of Edit Level Processing in Automatic Editing Action>
<7. Example of Edit List Processing in Automatic Editing Action>
<8. On air processing>
<9. Example of Edit List Processing During Broadcasting in Automatic Editing Action>
<1. Example of Structure of the Editing Apparatus>

Figure 1:
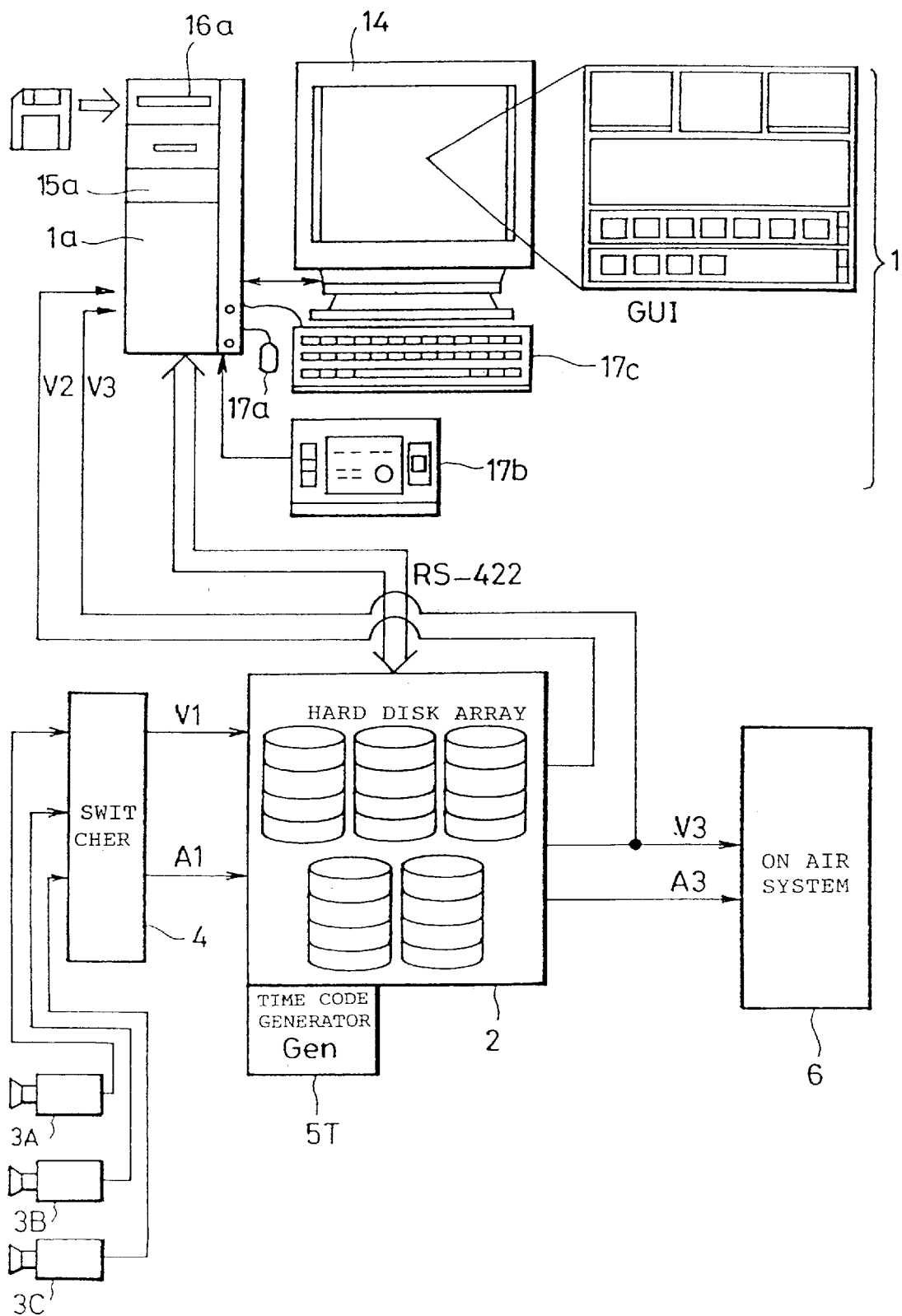
FIG. 1 is a configuration diagram showing an embodiment of an editing apparatus according to of the present invention.

First of all, an overall structure of an editing apparatus of the present embodiment will be described with reference to FIG. 1. FIG. 1 shows conceptually a hardware composition of the entire broadcasting system containing the editing apparatus.

The editing apparatus comprises a computer system 1, a hard disk array 2 and a time code generator 5T. The computer system 1 comprises computer main unit 1a, a local floppy disk drive 16a, local hard disk drive 15a, a monitor 14, a mouse 17a, a control panel 17b, a key board 17c and the like.

An application program for editing visual data transmitted has been installed in the computer system 1.

This application program installed in the computer 1 is a program which can be operated under the computer operating system. This application program contains a graphical user interface (GUI) for generating a control command.

Although an operator can input an importance degree of a picture through the mouse 17a, the control panel 17b and the key board 17c or the like which are an input device in the example as will be described later, an input value of the importance degree and timing value are recorded in a hard disk contained in, for example, the local hard disk drive 15a.

A plurality of hard disks are connected one another on the hard disk array 2. The hard disk array 2 is apparently controlled so that recording and reproduction are carried out at the same time. That is, a real-time input video signal V1 (and audio signal A1) can be recorded while a real-time video signal V2 is reproduced from the hard disk.

The time code generator 5T is structured as an instrument together with or separately from the hard disk array 2. Depending on a case, it may be provided inside the computer system 1. This time code generator 5T is initially set to [00:00:00] as, for example, hour/minute/second/frame time code, and its count-up is started when recording of the video signal V1 in the hard disk array 2 is started. A time code counted up is recorded in the hard disk array 2 with the video signal V1. That is, the time code is added to the video signal V1.

The computer system 1 and hard disk array 2 are connected to each other through a communication cable based on a communication format of the RS-422 interface. The RS-422 interface communication format is a communication format capable of transmitting/receiving the video signal and the control command simultaneously.

The video signal V1 to be inputted in and recorded in the hard disk array 2 is for example, a composite video signal taken by video cameras 3A–3B, and, selected by a switcher 4. This composite video signal is a signal transmitted according to a serial digital interface (SDI) format.

On the other hand, the video signals V2 and V3 to be outputted from the hard disk array 2 are also composite video signals transmitted according to the SDI format signal. Of course, the video signal to be inputted to/outputted from the hard disk array 2 may be a component video signal. Likewise, the video signal to be inputted to/outputted from the hard disk array 2 may be an analog composite video signal as well as a digital video signal.

The video signal V2 is read out at the same time when it is recorded in the hard disk array 2. That is, although this is a real-time video signal, this video signal V2 contains a time code generated by the time code generator 5T. The video signal V2 is supplied to the computer system 1.

On the other hand, the video signal V3 is a video signal which is reproduced from the hard disk array 2 corresponding to a reproduction command from the computer system 1. The audio signal A3 is audio signal corresponding to the video signal V3.

The video signal V3 and the audio signal A3 are supplied to an on-air system 6 and then broadcasted.

That is, the computer system selects a portion to be broadcast from the video signals recorded in the hard disk array 2 depending on a broadcasting time and the importance degree of every scene and makes the hard disk array 2 to reproduce that selected portion so as to output the edit picture for the broadcast.

Although not shown, on live broadcasting, the real-time reproduced video signal V2 is supplied to the on-air system 6 and outputted for broadcasting.

As for the action of this entire broadcasting system shown in FIG. 1, the video signal V1(V2) taken by the video cameras 3A–3C is inputted to each of the computer system 1 and the hard disk array 2. The video signal V2 inputted to the computer system 1 is displayed on a predetermined region of the monitor 14. On the other hand, the video signal inputted to the hard disk array 2 is coded on the real time and recorded in the hard disk.

An operator operating the computer system 1 can specify editing points such as an IN point (edition start point), an OUT point (edition end point) or the like by operating a pointing device such as the mouse 17a and so on connected to the computer system 1. Further, by using the GUI displayed on the monitor 14, a use control command for edition can be generated. The generated control command is transmitted to the hard disk array 2 as a control command for the RS-422 and executes reproduction control of the hard disk array 2.

The video signal V3 reproduced by the hard disk array 2 is displayed in a predetermined region of the monitor 14 of the computer system 1 and at the same time transmitted to the on-air system 6.

Figure 2:
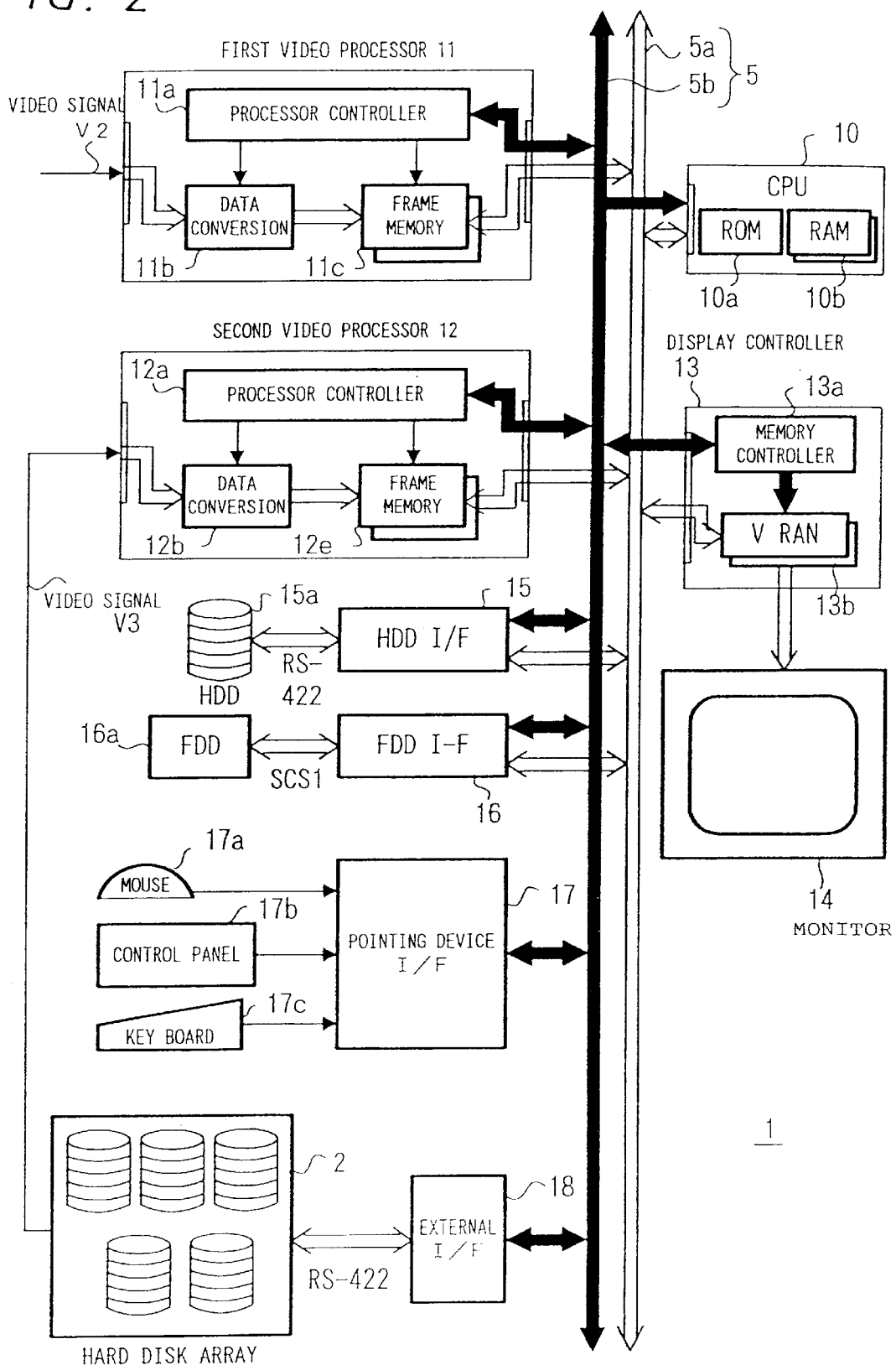
FIG. 2 is a block diagram showing examples of a major part of FIG. 1.

Next, an internal structure of the computer system 1 will be described in detail with reference to FIG. 2. The computer system 1 comprises a system bus 5 for transmitting a sending control signals and a video signal, a CPU 10 for controlling the entire computer system, a first video processor 11 and a second video processor 12 for carrying out picture processing and so on for the video signal, a display controller 13 for controlling a graphic display for the video signal displayed on the monitor 14 and the GUI, a HDD interface 15 for controlling a local hard disk drive (local HDD) 15a, a FDD interface 16 for controlling a floppy disk drive 16a, a cursor control device (generally called a mouse) 17a, a pointing device interface 17 for generating control data based on a command from a pointing device such as the control panel 17b, the key board 17c and the like, and an external interface unit 18 provided with a software driver for carrying out data communication based on the hard disk array 2 and the RS-422 communication format.

The system bus 5 is a bus to carry out a communication of video data, command data and address data within the computer system 1, and comprises a picture data bus 5a for transmitting the video data and a command data bus 5b for transmitting the control signal.

The first and second video processors 11, 12, the display controller 13, the HDD interface 15 and the FDD interface 16 are all connected to the picture data bus 5a. Therefore, the first video processor 11, the second video processor 12, the display controller 13, the HDD interface 15 and the FDD interface 16 are connected through this picture data bus 5a so as to enable transmission of the video data among the respective blocks.

On the other hand, the CPU 10, the first video processor 11, the second video processor 12, the display controller 13, the HDD interface 15, the FDD interface 16, the pointing device interface 17 and external interface unit 18 are connected to the command data bus 5b. That is, all the blocks in the computer system 1 are connected through this command data bus 5b.

The CPU 10 is a block for controlling the entire computer system. This CPU 10 comprises a ROM 10a storing operating system of the computer system 1 and a RAM 10b storing an uploaded program from the application program stored in the hard disk 15a. Upon starting the computer system 1, the CPU 10 executes a software program based on the operating system stored in the ROM 10a. When an application is executed under this operating system being actuated, the CPU 10 reads the application program stored in hard disk of the hard disk drive 15a and uploads it to the RAM 10b.

The first video processor 11 is a block to receive the composite video signal V2 inputted to the computer system 1 from the hard disk array 2, and carry out data conversion for this video signal V2 and temporarily buffering converted composite video signal.

Concretely, the first video processor 11 comprises a processor controller 11a for controlling the entire video processor 11, a data conversion portion 11b for converting received analog composite video signal to digital component video data, and a frame memory 11c for temporarily storing video data of several frames delivered out from the data conversion portion 11b.

The processor controller 11a sends a control signal for data conversion to the data conversion portion 11b and also sends control signal for extracting a time code from the composite video signal inputted to the data conversion portion 11b, to the data conversion portion 11b. Further, the processor controller 11a outputs a control signal for controlling read/ write timing for the frame memory 11c and read/write address. Concretely, the processor controller 11a controls the read timing of the GUI manager and frame memory 11c.

According to the control signal from the processor controller 11a, the data conversion portion 11b converts an analog composite video signal to a component video signal and then converts to digital video data. During the conversion to the digital video data, a time code data is extracted. Video data converted to digital is sent to the frame memory 11c while the extracted time code is sent to the processor controller 11a.

Here, how the time code is sent and extracted will be described. This composite video signal V2 is an analog composite video signal superimposed with the time code during vertical synchronization period of the input video signal V1. This time code is a signal inserted into two lines, 14H and 16H or 12H and 14H of the vertical blanking period, and generally called a VITC (vertical interval time code). In the present example, this time code is generated by the time code generator 5T. Then, the composite video signal is superimposed with encoded time code.

If it is intended to extract this time code from the composite video signal V2, when an analog signal is converted to digital data, only the time code converted to digital during the vertical synchronization is decoded, so that the time code can be extracted easily.

Video data converted to digital is temporarily stored in the frame memory 11c. The read/write timing of the frame memory 11c is controlled by the processor controller 11a. The frame memory 11c is formed of two frame memories (having a capacity of 1 Mbyte each), so that totally 4 Mbyte capacity is preserved.

Video data to be stored in this frame memory 11c is video data consisting of 1520 pixels×960 pixels. The above frame memory is capable of storing video data of two frames. The video data of 1520 pixels×960 pixels stored in the frame memory 11c is read by read control of the processor controller 11a. The video data read from the frame memory 11c is not 1520 pixels×960 pixels or all pixel video data, but 380 pixel×240 pixel video data obtained by extracting a predetermined data amount. Extraction of the data mentioned here refers to simply decreasing the sampling rate for reading video data from the frame memory 11c by ¼ so as to reduce the amount of video data to be read.

The read video data of 380 pixels×240 pixels is sent to the display controller 13 through the pixel data bus 5a.

The second video processor 12 has the same structure as the first video processor. That is, the second video processor 12 comprises a processor controller 12a for controlling the entire video processor 12, a data conversion portion 12b for converting a received analog composite video signal to digital component video data, and a frame memory 12c for temporarily storing video data of several frames sent from the data conversion portion 12b. A different point between the first video processor 11 and the second video processor 12 exits in that the composite video signal V2 is inputted to the first video processor 11 while the composite video signal V3 is inputted to the second video processor 12.

Because the composite video signal V2 is the video signal superimposed with the time code during the vertical synchronization period of the input video signal V1 inside the hard disk array 2, this is the same video signal as the input video signal to be inputted in view of time. That is, the video data to be stored in the frame memory 11c is the same video data as digitized input video signal.

The composite video signal V3 is a video signal reproduced from the hard disk array 2 according to an instruction from the computer system 1. Therefore, this composite video signal V3 is a video signal not timely relating to the input video signal V1.

If an operator instructs the computer system 1 to reproduce a desired video data, the computer system 1 outputs a reproduction command to the hard disk array 2. The hard disk array 2 reproduces the video data instructed by the operator and the time code corresponding to this video data according to the command from the computer system 1. Meanwhile, the time code and the video data are stored in the hard disk array 2 in the unit of frame so that they correspond to each other.

Next, the reproduced video data is superimposed with the time code reproduced during its vertical synchronization period. Then, the video data superimposed with the time code is converted to analog composite video signal V3 so as to be sent to the computer system 1 and sent to the computer system 1 side.

The composite video signal V3 supplied to the second processor is sent to the display controller 13 as the 380 pixel ×240 pixel digital video data through the data conversion portion 12b and the frame memory 12c like the composite video signal supplied to the first video processor.

The display controller 13 is a control block for controlling data to be displayed on the monitor 14. The display controller 13 comprises a memory controller 13a and a VRAM (video random access memory) 13b. The memory controller 13a controls read/write timing of the VRAM 13b according to the internal synchronization inside the computer system 1. This VRAM 13b stores the video data from the frame memory 11c of the first video processor 11, the video data from the frame memory 12c of the second video processor 12 and the image data from the CPU 10 according to the timing control signal from the memory controller 13a.

The image data stored in the VRAM 13b is read from the VRAM 13b according to the timing control signal from the memory controller 13a based on the internal synchronization of the computer and displayed on the monitor 14. The graphic display on the monitor 14 is a graphic display for the GUI. The image data sent from the CPU 10 to the VRAM 13b are image data such as a window, a cursor, a switch bar or the like. By displaying these plural image data on the monitor 14, the graphic display for the GUI is obtained.

The hard disk interface 15 is a block for providing interface with the local hard disk drive (HDD) 15a provided inside the computer system 1. This hard disk interface 15 and the hard disk drive 15a are capable of communicating with each other according to a transmission format of SCSI (small computer system interface).

The hard disk drive 15a is installed with an application program to be operated by the computer system 1 and when it is intended to execute the application program, it is read from this hard disk drive 15a and uploaded on the RAM 11b. When this application program is ended, a work file created by an edition operator and stored in the RAM 11b is down-loaded to this hard disk 15a.

In the present embodiment, the operator can input a value of the importance degree in terms of scene while watching a real-time picture (that is, a picture based on the video signal V2) through the monitor 14. The inputted importance degree value is stored with the time code of that timing, and that storage is carried out in the hard disk 15a. However, the hard disk 15a is not always required to be used, but it is permissible to use the RAM 10B in the CPU 10 if its capacity is sufficient.

The floppy disk interface 16 is a block for providing an interface with the floppy disk drive (FDD) 16a provided inside the computer system 1. The floppy disk interface 16 and the floppy disk drive 16a are capable of communicating with each other according to the SCSI communication format.

The pointing device interface 17 is a block for providing an interface with the mouse 17a, the control panel 17b and key board 17c connected to the computer system 1. The pointing device interface 17 receives, for example, detection information of a secondary rotary encoder provided on the mouse 17a and click informations of right and left buttons of the mouse 17a, from the mouse 17a. Then, the pointing device interface 17 decodes the received information and then sends to the CPU 10. Likewise, the pointing device interface 17 receives informations from the control panel 17b and key board 17c and decodes the received information and then sends to the CPU 10.

In the above embodiment, the above importance degree value can be inputted by using the pointing device. That is, the switch images of the importance degree values are displayed on the GUI screen, so that the importance degree values are inputted by clicking the mouse 17a or pressing a switch corresponding to the importance degree value prepared on the control panel 17b or key board 17c.

The external interface 18 is a block for communicating with the hard disk array 2 connected to the outside of the computer system 1. The external interface 18 has the RS-422 driver for converting command data generated by the CPU 10 to a RS-422 communication protocol.

<2. Example of Structure of Screen of the Editing Software>

Graphic display for the GUI on the monitor 14 will be described with reference to FIG. 3.

On the graphic display on the monitor 14 there are set a recorded video display area 21, an operation key display area 22, a reproduced video display area 23, an importance degree display area 24, a clip display area 25, and a program display area 26 if it is classified roughly.

The recording video display area 21 has a recording video screen 21a, a time code display portion 21b corresponding to the current recording time, and a recording indicating portion 21c.

The video signal displayed on the recording video screen 21a is a video signal obtained from the composite video signal V2 outputted from the hard disk array 2 and supplied to the VRAM 13b from the frame memory 11c in the form of 380 pixels ×240 pixels.

The time code display portion 21b indicates the time code extracted from the video signal V2.

The operation key display area 22 displays an importance degree switch 22a, a recording start key 22b, a recording stop key 22c, a play back key 22d, a stop key 22e, search keys 22f, 22g and the like.

If the mouse 17a is operated and each of the operation keys is clicked, the operation information of that operation key is inputted to the CPU 10.

The importance degree switches 22a can input three kinds of importance degree like "level 1", "level 2" and "level 3". Thus, the operator can set four levels of the importance degree including "level 0" which is selected when he does not operate the importance degree switch 22a.

The reproduction video display area 23 includes a reproduction video screen 23a, a time code display portion 23b and a play back indicating portion 23c.

The video signal displayed on the reproduction video screen 23a is a video signal obtained from the composite video signal V3 outputted from the hard disk array 2 and supplied to the VRAM 13b from the frame memory 12c in the form of 380 pixels×240 pixels.

The time code display portion 21b indicates a time code corresponding to the time of a screen displayed on the reproduction video screen 23a or the time code extracted from the video signal V3.

The importance degree display area 24 contains a time code bar display portion 24a, an importance degree bar display portion 24b and an index number display portion 24c.

The time code bar display portion 24a indicates a time code beginning from "00:00:00:00" of video data recording start time of the hard disk array 2 in the form of a scale.

The indication modes of the importance degree bar display portion 24b and the index number display portion 24c are decided depending on the input of the importance degree value by the operator.

The operator enters the importance degree value while watching the recording video screen 21a of the recording video display area 21, namely scenes taken currently by the video cameras 3A–3C. In the example shown in FIG. 3, it is assumed that the operator entered the importance degree value which is the "level 1" at the time of recording start.

Thus, at the time of "00:00:00:00" in time code, the index number "1" is given and the "level 1" is displayed on the importance degree bar display portion 24b.

Next, it is assumed that the operator has entered the importance degree value of "level 2" at the time of "00:07:22: 05" in time code. Correspondingly, the index number "2" is given to a position corresponding to 7 minute 22 second 5 frame of the time code bar display portion 24a. Further, after this index number of "2", an display corresponding to "level 2" is performed in the importance degree bar display portion 24b.

In subsequent operations, similarly corresponding to an input of the importance degree by the operator, the index number is given and an display corresponding to the importance degree value inputted in the importance degree bar display portion 24b is carried out. This example indicates that the operator entered the importance degree value 18 times during recording for about two hours.

The clip display area 25 indicates a clip picture corresponding to each index number. Each clip display area comprises a clip picture display portion 25c, an index number display portion 25d and a time code display portion 25e.

Namely the clip picture mentioned here refers to a picture taken when the operator inputs the importance degree value, and with an index number given accompanying that input, a picture (still picture) taken at that time and a time code are successively displayed. In the state shown in FIG. 3, the clip pictures corresponding to the index numbers "10"–"18" are displayed.

In the clip display area 25 are displayed a clip feed key 25a and a clip return key 25b. By clicking these keys, a displayed clip picture can be fed forward or backward in time series. For example, if the. clip return key 25b is clicked once, in the state shown here, the clip pictures corresponding to the index numbers "9"–"17" are displayed.

In the program display area 26 are respectively displayed head screens of portions selected in the editing treatment mentioned later as an event screen.

As an display corresponding to each event, the event picture display portion 25c, the index number display portion 25d, the time code display portion 25d and an event internal position display portion 26f are prepared.

For example, assume that the video data of time range 1–6 in the index number are selected in the importance degree display area 24 as a portion to be broadcast. Then, this portion is displayed as a first event in the program display area 26. For example, if "IN" is displayed as the event internal position display portion 26f, it indicates a head of that event, and the event picture display portion 25c, the index number display portion 25d and the time code display portion 25e are displayed a still picture as a head of the event, the index number and the time code. In this case, the index number "1", the time code "00:00:00:00" and the picture at that time are displayed.

Likewise, assume that video data of time range 7–10 in the index number is selected in the importance degree display area 24 as a portion to be broadcasted. Then, this portion is displayed as a second event in the program display area 26. For example, if "IN" is displayed in the event internal position display portion 26f, as a head of that event, the index number "7", the time code "00:42:15:00" and the picture at that time are displayed.

In the program display area 25, the event feed key 26a and the event return key 26b are displayed. By clicking these keys, the displayed event picture can be fed forward or backward in time series.

<3. Switch Level Processing Upon Recording>

To edit a program optimally corresponding to the importance degree of scene for ordinary recorded program broadcasting or time-shift recorded program broadcasting, and then to use the edited result as video data for broadcasting in the above described editing apparatus, the operator judges a content of a scene by watching its real-time picture when recording the pictures taken by the video cameras 3A–3C in the hard disk array 2 and inputs its importance degree. If the importance degree value is inputted, the importance degree value (aforementioned level 1–level 3) and the time code at that time are corresponded and stored, for example, in the local hard disk drive 15*a*, so that finally, a table data (switch level list which will be described later) corresponding to the display state of the importance degree display area 24 shown in FIG. 3 is formed.

In the following description, an importance degree value which the operator inputs at real time is referred to as a switch level, and an importance degree value (or a value generated based on the switch level) which is changed for on-air selection although it was automatically or manually inputted is referred to as an edit level.

The switch level can be also inputted by watching a reproduced picture after recording or the inputted importance degree value and corresponding time code can be changed. However, in the following description, a case in which the operator inputs the importance degree value at real time and performs recording will be taken as an example.

Figure 5:
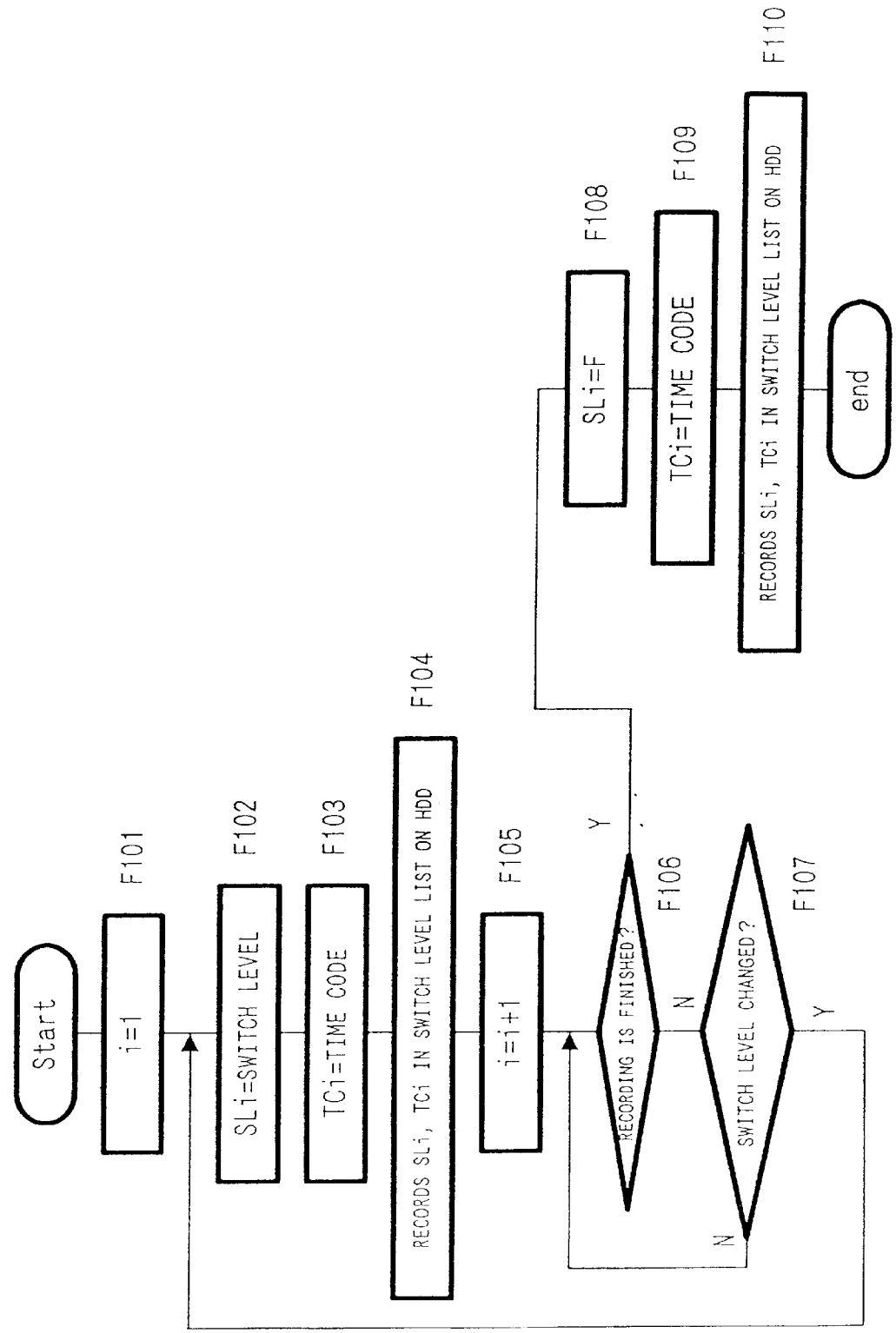
FIG. 5 is a flow chart showing an example of switch level processing at the time of recording.

The operator sets the switch level (importance degree value) at the time of recording. The processing of the CPU 10 corresponding thereto is carried out as shown in FIG. 5.

First, a variable i=1 is set at step F101. The variable i is a value corresponding to the index number.

The operator sets the switch level using the importance degree switch 22*a* on the GUI screen or the key board 17*c* and the control panel 17*b*. If nothing is operated, the importance degree or switch level is determined so that the "level 0" has been inputted.

Just after recording is started, a switch level SLi or switch level SL1 corresponding to index number=1 is set. For example, if the operator operates "level 1" just after the recording is started, it is determined that the switch level SL1=1. At the same time, at step F103, a time code TCi or time code TC1 corresponding to index number=1 is set.

The time code TC1 is "00:00:00:00" which is the time code at the time of recording start.

At step F104, the switch level SL1 and the time code TC1 set in this manner are transferred to the local disk drive 15*a* and recorded as data forming the switch level list.

Next, at step F105, the variable i is incremented and, whether or not the recording ends at step F106, or whether or not the switch level is changed at step F107 is awaited.

If the operator determines that an important scene has come while watching a recorded picture or determines that the importance degree of the scene drops, he operates the importance degree switch 22*a* and so on appropriately.

For example, assume that the operator determines that the importance degree has arisen at the time of 7 minutes 22 seconds 5 frames from the start of the recording and then he operates so as to make the importance degree to be "level 2" Then, the processing advances from step F107 to F102, so that the switch level SLi or switch level SL2 corresponding to index number=2 is set to the "level 2". Further, at step F103, the time code TCi or a time code TC2 corresponding to the index number=2 is set to "00:07:22:05".

Then, such set switch level SL2 and time code TC2 are transferred to the local hard disk drive 15*a* at step F104 and recorded as data of the switch level list corresponding to the index number=2.

Each time when the operator inputs the switch level, the switch level SLi and the time code TCi are recorded as data of the switch level list.

For example, if the recording stop key 22*c* of the operation key display portion is clicked or the like so that it is determined that the recording ends, the processing proceeds from step F106 to F108 and the switch level SLi="F" is attained and at step F109, as the time code TCi, a time code value of that time is entered. Next at the step F110, the switch level SLi and the time code TCi are transferred to the local hard disk drive 15*a* and recorded as a final data of the switch level list corresponding to a final index number.

By such switch level processing, a switch level list as shown, for example, in FIG. 7 is produced in the local hard disk drive 15*a*. That is, at every index number, the time code and the switch level are produced in the form of table data.

Figure 3:
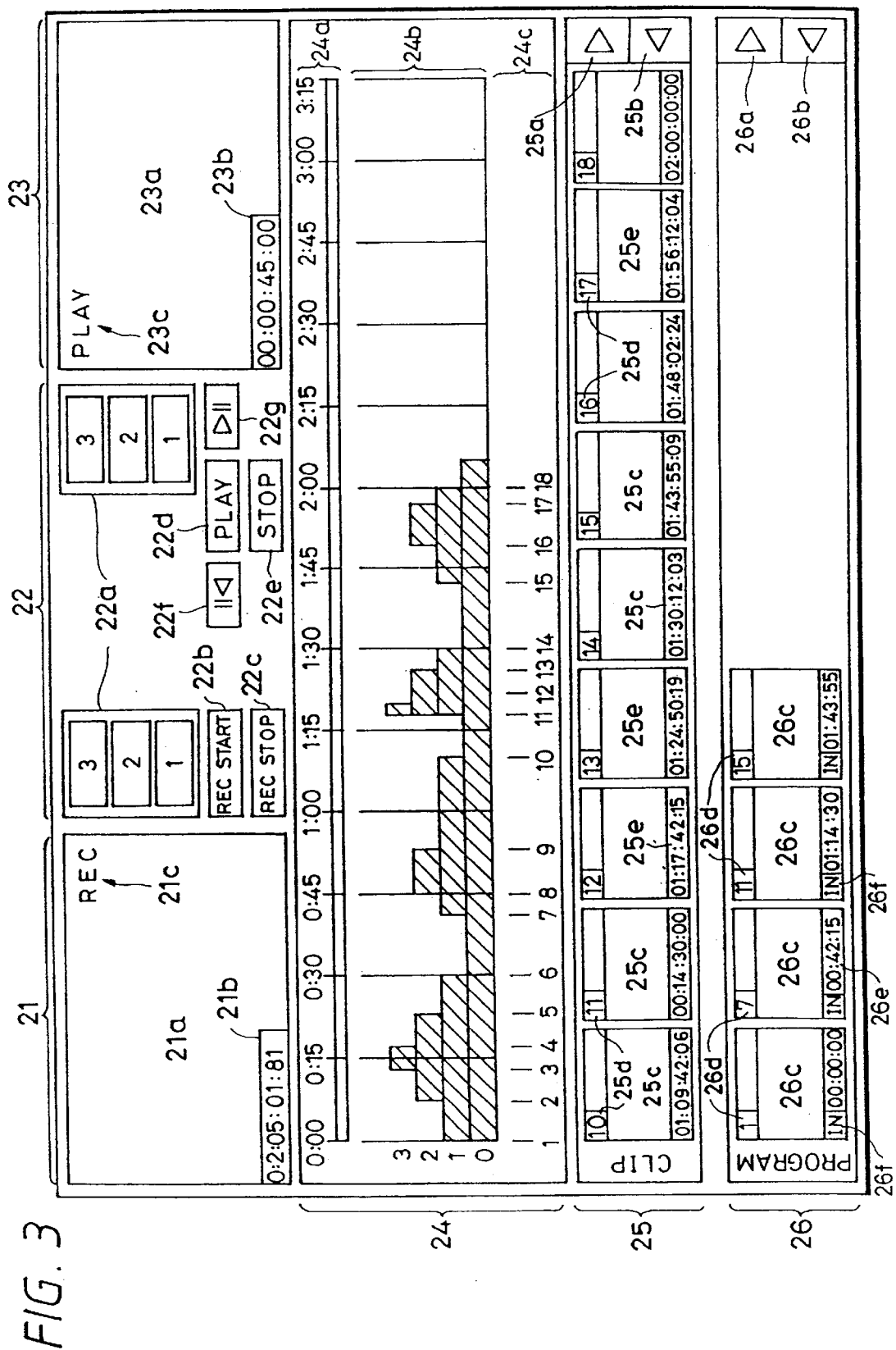
FIGS. 3 and 4 are diagrams used for explaining a GUI screen.

The example of FIG. 7 is an example in which the operator inputs the switch level 18 times during recording for two hours and is a data example corresponding to the contents of display in the importance degree display area 24 shown in FIG. 3.

<4. Example of Manual Editing Action 1>

Using such a switch level list, an optimum edition is carried out corresponding to a set broadcast time and the on-air processing is carried out. The editing processing is divided to a manual edition and an automatic edition. First, the manual edition will be described.

An example in which video data recorded for two hours is edited using the switch level list so as to match with to broadcast time of 1 hour 30 minutes will be described below.

To carry out a preferred edition based on the switch level list, basically portions having high switch level are extracted. However, an operator cannot always input the switch level at appropriate timing, thus the switch level list needs to be updated to some extent.

A list for use in necessary updating the switch level list and selecting an interval finally subjected to on-air is called an edit list.

A processing of necessary updating the switch level list and selecting a portion subjected to on-air will be described with reference to FIGS. 3, 4 and 6.

The display of the importance degree display area 24 shown in FIG. 3 is an image displayed corresponding to the switch level list shown in FIG. 7.

If an attention is paid to the portion in which an index number=11(time code "01:16:20:20"), the portion provided with "level 0" up to just before is provided with "level 3" which means the most important scene. This is, for example, a case in which suddenly an important scene occurs in live broadcasting of sport event and so on.

However, in such a case, the operator inputs the switch level after confirming the important scene. Thus, a portion before time of "01:16:20:20" becomes also an important scene. Of course, this portion should be on the air as an introductory scene for that important scene.

Thus, at the time of "01:16:20:20", it is not appropriate to cut a portion just before because that portion is on "level 0" according to the switch level list. Then, for the portion just before "01:16:20:20", a modification procedure for raising its importance degree is carried out.

FIGS. 6(*a*), (*b*) show an image which is displayed in the importance degree display area 24 as shown in FIG. 3 corresponding to the switch level list shown in FIG. 7. As an example of change, a portion expressed by "(11)" in the index number in FIG. 6(*b*) (time of "01:16:20:20" in time code) is changed to a portion expressed by "11" (e.g., time of "01:14: 30:00" in time code) so that this new portion having the index number=11 and the followings are determined to be portion not of "level 0".

Figure 4:
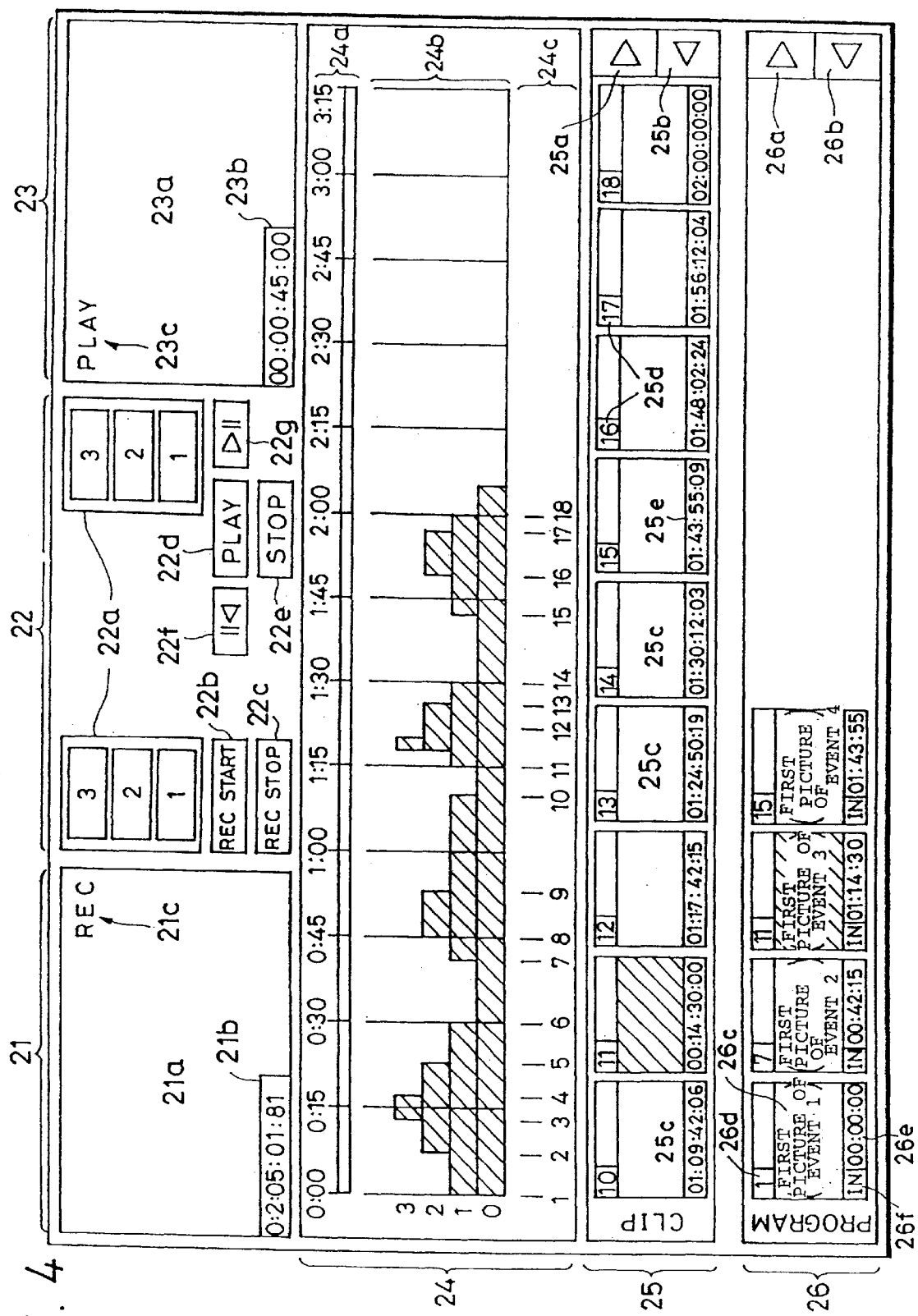

An display state after change is shown in FIG. 4.

As shown in FIG. 6(*c*), a portion not of "level 0" is extracted and the video data which should be on the air are named events 1–4.

By broadcasting the portions named events, a program for 1 hour 30 minutes by an appropriate edition is realized as shown at the bottom of FIG. 6(c).

In this case, an example of the edit list generated by the CPU 10 is shown in FIG. 8.

FIG. 8 corresponds to a state shown in the importance degree display area 24 of FIG. 4 and shows an example of generating the edit list in which a section of "level 0" and a section of high than "level 1" are defined.

Thus, the boundary timings of the sections are "1", "6", "7", "10", "11", "14", "15" and "18" in terms of index number of FIG. 4 and the sections starting with the timing of each index number are managed in the list shown in FIG. 8.

That is, the time codes of each row of this edit list are time code values corresponding to the index numbers "1", "6", "7", "10", "11", "14", "15" and "18".

In this case, if the switch level is "level 0", the edit level is "0", and if the switch level is equal to or higher than "level 1", the edit level is "1".

Then, a portion in which the edit level is "1" is set to be a portion to be "on air".

On air time refers to an accumulated time of sections set to be "on air" and off time refers to an accumulated time of sections not set to "on air".

In this case, the time code of the index number "11" is changed so that an important scene is included in on-air portion. A portion extracted for on air becomes just 1 hour 30 minutes.

The control system 1 sends a required reproduction command to the hard disk array 2 according to such an edit list and outputs video data of 1 hour 30 minutes as the video signal V3 (and audio signal A3) to the on-air system 6.

An example of operation for changing the display state of the importance degree display area 24 of FIG. 3 to an display state of the importance degree display area 24 of FIG. 4 by a manual operation will be described.

First, to specify that the portion of the index number "11" is to be changed, the operator clicks the clip picture of the index number "11" in the clip display area 25.

Then, correspondingly, the CPU 10 outputs a reproduction command to the hard disk array 2 so as to reproduce a portion of "01:16:20:20" in time code of the index number "11".

The video signal V3 outputted from the hard disk array 2 corresponding to the reproduction command is displayed in the reproduced video display area 23.

The operator searches for a desired scene by clicking the search keys 22f, 22g while watching a picture in the reproduced video display area 23. Corresponding to clicking of the search keys 22f, 22g, the CPU 10 makes the hard disk array 2 to search the reproduction portion.

If the operator finds an appropriate scene by operating the search keys 22f, 22g, a required importance degree value is inputted at that position by the importance degree switch 22a.

The CPU 10 determines that the timing of the index number "11" has been changed corresponding to that input and then determines that the importance degree level has been changed at that time of the new time code. That is, it determines that the state of FIG. 4 has been gained and changes the display state of the importance degree display area 24 as shown in FIG. 4.

As shown by the hatch lines in the clip display area 25 of FIG. 4, the clip picture of the index number "11" is changed to a picture of a scene fitting to the new time code.

Further, it means that the section of the event 3 has been changed. Thus, the time code and the picture at starting portion of event 3 in the program display area 26 are also updated.

Corresponding to such operation, the date of the switch level list has been updated, so that the edit list of FIG. 8 is formed. Thus, a portion to be on the air is edited as described in FIG. 6.

<5. Example of Manual Editing Action 2>

In the example of the above manual editing action, as shown in FIG. 8, the edit list in which the portion to be the on air is set to "1" and the portion not to be the on air is set to "0" is produced. However, in the example of manual editing action 2, several stages of the edit levels are produced corresponding to the switch level and further, as the selection reference for the edit level, an on-air level is set and an edition is performed.

FIG. 10(a) shows a switch level list produced by an input of the operator and the content of the data thereof is the same as the switch level of FIG. 7. FIGS. 9(a), (b) show an image displayed in the importance degree display area 24 as shown in FIG. 3 corresponding to the switch level list of FIG. 10(a).

Based on the switch level list set as shown in FIG. 10(a), the importance degree bar display and index number display are carried out as shown in FIG. 9(a). The operator performs necessary changes thereto.

FIG. 9(c) shows the importance degree bar display and the index number display as a result of the change operation by the operator.

It is assumed that the operator carries out an index number shift and inputs new importance degree value input by operating by using the GUI screen and then the importance degree level and the time code value have been updated as shown in FIG. 9(c). A number to be given to a new edition point by shifting the index number is called an edit index number.

An edit level list corresponding to the state of FIG. 9(c) is as shown in FIG. 10(b). That is, corresponding to the edit index numbers "1"–"16", the time code at that position and edit level ("0"–"3") from that time, that is, the importance degree value which the operator newly sets are described in the list.

By using such an edit level list and setting the on-air level as a standard for selecting an on-air portion, an edit list as shown in FIG. 11 is produced.

The on-air level is a value for selecting a portion in which the edit level is equal to or higher than its on-air level, as a portion to be "on air". For example, this is set by an input by the operator.

In the example shown in FIG. 11, the on-air level is all set to "1".

Based on comparison between the on-air level and the edit level, the edit list is produced. That is, as for each video data interval represented by each line of this list, the video data interval in which the edit level is equal to or higher than "1" of the on-air level is to be the on air.

Then, as the on-air time, integrated time of intervals set to "on air" is calculated and as off-time, an accumulated time of intervals not set to "on air" is calculated.

In this case, a target time as the on-air time is "01:30:00:00" shown outside the bottom frame of the list or 1 hour 30 minutes set as the broadcasting time frame.

However, the accumulated time of the on-air time is "01:36:30:00". That is, the total time of the portions selected as the portions to be the on air is 1 hour 36 minutes 30 seconds, which is 6 minutes 30 seconds over a time length to be edited.

To eliminate that over portion, for example, a processing of changing partially the on-air level is carried out.

FIG. 12 shows a state in which the on air level from a section starting with "01:15:00:00" in time code to a section starting with "01:42:00:00" has been changed to "2".

That is, in this interval, only the portion in which the edit level is over "2" is selected as "on air".

Thus, as evident by comparing with FIG. 11, a section beginning with "01:15:00:00" in time code and a section beginning with "01:26:30:00" in time code are taken out of selection as the on air portion.

Looking at the on air time at this state, its accumulated time is "01:30:00:00" which coincides with an hour 30 minutes set as the broadcasting time frame. Thus, according to the edit list shown in FIG. 12, the computer system 1 makes the hard disk array 2 to execute the reproduction of the portion selected as "on air" and supply to the on air system 6. As a result, an appropriate broadcasting coinciding with a predetermined broadcasting time and containing important scene is realized.

<6. Example of Edit level Processing in Aautomatic Editing Action>

In the processings described above, the operator modifies the switch level list by the manual operation so as to set the edit level. From here, an automatic editing action in which the CPU 10 automatically sets the edit level and produces the edit list according to the switch level list will be described.

First, a processing for setting the edit level which automatically updates the switch level list data to an optimum condition will be explained with reference to FIGS. 13–15.

As described above, because the switch level is used to set the importance degree value while watching a real-time recorded scene, often an operator raises the importance degree value slightly after an important scene appears. Thus, after a required change is applied to the switch level as the edit level, the on air portion is selected as described above.

Upon automatically generating the edit level, because the operator often updates the importance degree value slightly late when he raises the importance degree of a scene, for a portion in which the importance degree value is inclined to change in a direction to increase on a switch level list, it is preferred to generate an edit level list in which the timing of changing the importance degree is shifted forward in time series.

In this embodiment, in the portion in which the importance degree value is inclined to change in a direction to decrease on the switch level list, the timing is shifted backward in time series so that the edit level list is generated.

FIG. 13 shows an image for automatically generating the edit level from the switch level. Assume that the switch level changes at timings shown by dotted line as shown in FIG. (3a). FIG. 13(b) shows the edit level automatically generated and the hatched portions (TU1–TU3, TD0–TD2) indicate automatically changed portions.

That is, about the timing in which the switch level changes from "level 0" to "level 1", the time code is shifted forward by a time TU1, so that an interval of "level 1" is extended forward.

About the timing in which the switch level changes from "level 1" to "level 2", the time code is shifted forward by a time TU2, so that the an interval of "level 2" is extended forward.

About the timing in which the switch level changes from "level 2" to "level 3", the time code is shifted forward by a time TU3, so that an interval of "level 3" is extended forward.

Here, TU3>TU2>TU1 is set, so that a portion in which the importance degree value changes to a higher value is extended forward by a longer time.

About the timing in which the switch level changes from "level 3" to "level 2", the time code is shifted backward by a time TD2, so that an interval of "level 3" is extended backward.

About the timing in which the switch level changes from "level 2" to "level 1", the time code is shifted backward by a time TD1, so that an interval of "level 2" is extended backward.

About the timing in which the switch level changes from "level 1" to "level 0", the time code is shifted backward by a time TD0, so that an interval of "level 1" is extended backward.

Here, TD2>TD1>TD0 is set, so that a portion in which the importance degree is of a higher value is extended backward by a longer time.

In automatically setting the edit level as shown in FIG. 13(b), portions forward and backward of an important scene are automatically determined to be relatively important scenes and an appropriate edition is carried out so that such portions are not excluded from the on-air portion.

When it is assumed that TU1=30 seconds, TU2=1 minute, TU3=2 minutes, TD0=15 seconds, TD1=30 seconds, and TD2=1 minute, an edit level list automatically generated from a switch level list shown in FIG. 15(a) is as shown in FIG. 15(b).

The switch level list shown in FIG. 15(a) shows the same data as the switch level list shown in FIG. 10(a). "up" and "down" on the left column of the edit level list shown in FIG. 15(b) indicates which the switch level changes up or down at a boundary (edition point) of a section in which an index number is given of the switch level list, and indicates a state in which correspondingly, the time code is shifted forward or backward.

For example, a starting point of an interval of the index number 2 is a point where the switch level changes form "level 1" to "level 2". Thus, an interval of "level 2" is extended forward by a minute as the TU2 and the time code of "00:07:22:05" in the switch level list is changed to "00:06:22: 05" in the edit level list.

A starting point of an interval of the index number 4 is a point in which the switch level is changed from "level 3" to "level 2". Thus, an interval of "level 3" is extended backward by a minute as the TD 2, so that the time code value of the index number 4 of an end point of an interval of "level 3" or a starting point of an interval of "level 2" is updated from "00:16:45:02" in the switch level list to "00:17:45:02" in the edit level list.

In portions of the other index numbers, the time code is shifted forward or backward depending on up or down of the switch level, so that the edit level list is formed.

Figure 14:
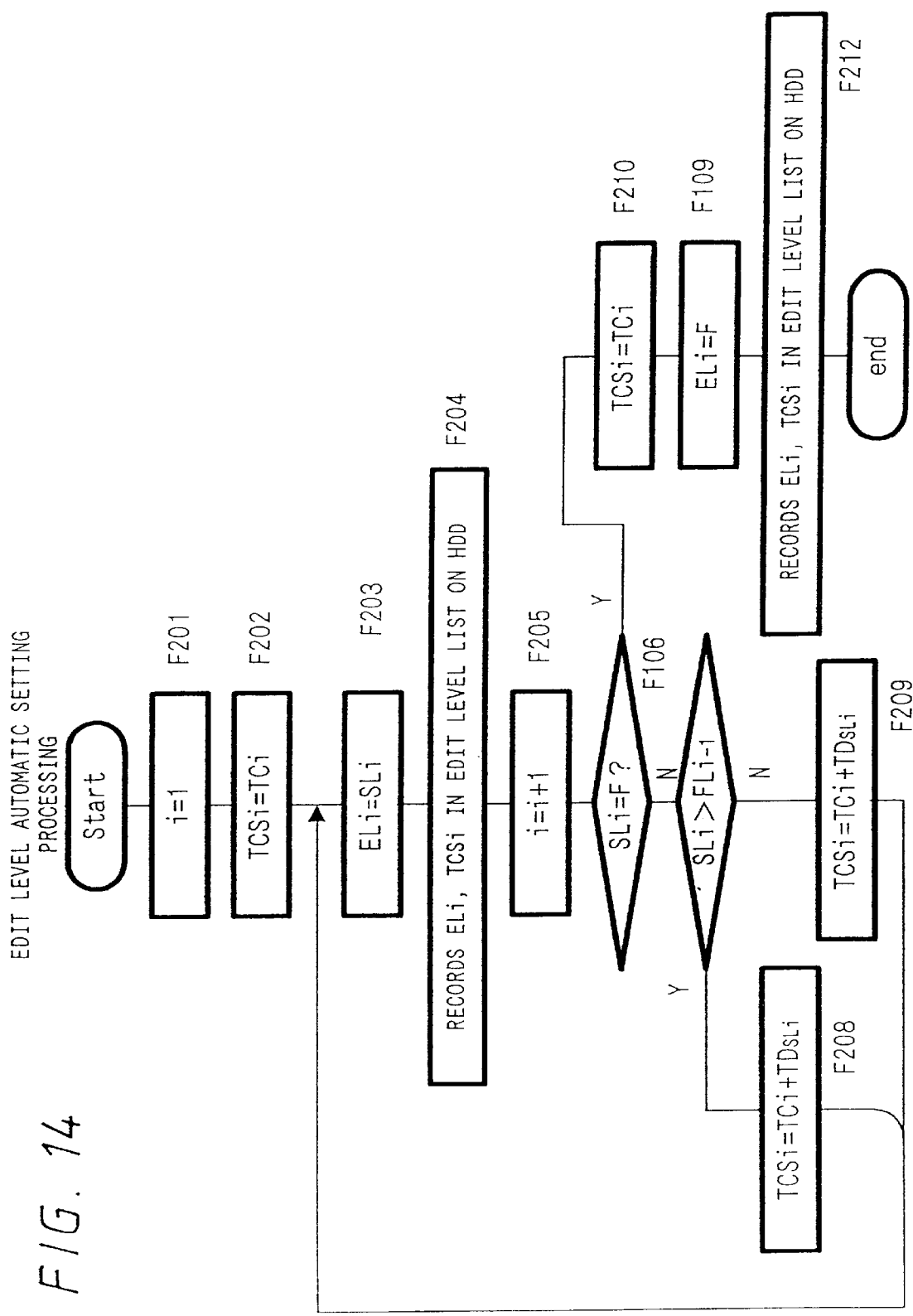
FIG. 14 is a flow chart showing an example of the edit level automatic setting processing.

The processing of the CPU 10 for setting such an edit level list shift is shown in FIG. 14.

First, at step F201, the variable i=1 is set, where the variable i is a value corresponding to index number.

At step F202, a time code TCi is substituted for a shift time code TCSi. The shift time code TCSi refers to a time code represented on the edit level list or is a time code as a result of shifting a time code of the switch level list forward or backward by a predetermined time. At step F202, the first time code TC1 or "00:00:00:00" is a value of the shift time code TCSi.

Next, at step F203, a switch level SLi is substituted for an edit level ELi. First, a value of the switch level SL1 is substituted for the edit level EL1. Then, at step F204, the edit level ELi and the shift time code TCSi (i=1) are transferred to the hard disk drive 15a as a first line data for the edit level list and recorded therein.

Next, the variable i is incremented (F205) and at steps F206, F207, the switch level SLi or switch level SL2 is determined. First, at step F206, whether or not the switch level is "F" indicating a recording end is determined. At step F207, whether or not the switch level SL2 is larger than the edit level EL(i−1) or the edit level ELi just before it is determined.

That is, a processing of step F207 is a processing for determining which the switch level has changed to a larger value or smaller value at the next index number point.

If an affirmative result is obtained here or the switch level is changed to a larger value, the processing proceeds to step F208, in which the time code TCi minus the time TU(SLi) is substituted for the shift time code TCSi. In this case, because the variable i=2, the shift time code TCS2=TC2−TU (SL2).

The TU(SL2) is any one of the aforementioned addition times TU3, TU2, TU1, and if the switch level is "2" under the index number of "2", TU(SL2)=TU2. Then, if TU2=1 minute is set as described above, the shift time code TCS2 is a value obtained by subtracting 1 minute from time code TC2.

If at step F208, the shift time code TCS2 is set like this, the processing proceeds to step F203, so that the switch level SLi is substituted for the edit level ELi. That is, the switch level SLi is substituted for the edit level EL2. That is, the switch level SL2 is substituted for the edit level EL2. At step F204, the edit level EL2 and the shift time code TCS2 are transferred to the hard disk drive 15a as a second line data in the edit level list and recorded therein.

In a case when the variable i is being incremented and the switch level is changed upward, the same procedure is carried out.

In an example shown in FIG. 15, at the timing of the index number 4, the switch level changes down from "level 3" to "level 2".

In this case, when the variable i=4, at step F207, a negative result is obtained and the processing proceeds to step F209.

A value of the time code TCi minus the time TD(SLi) is substituted for the shift time code TCSi. In this case, because variable i=4, the shift time code TCS4=TC4+TD(SL4).

The TD(SL4) is any one of the aforementioned addition times TD2, TD1, TD0 and if the switch level is "2" under the index number of "4", TD(SL4)=TD2. If TU2=1 minute is set as described above, the shift time code TCS2 is a value of the time code TC2+1.

If at step F209, the shift time code TCSi (i=4) is set in this way, the processing proceeds to step F203, in which the switch level SLi is substituted for the edit level ELi. That is, the switch level SL4 is substituted for the edit level EL4. Then, at step F204, the edit level EL4 and the shift time code TCS4 are transferred to the hard disk drive 15a as a fourth line data in the edit level list and recorded therein.

In following processing, the variable i is being incremented and at the point of each index number, depending on up or down change of the switch level and the switch level value, the addition time (TU1–TU3, TD0–TD2) is added or subtracted relative to the time code. The time code or the shift time code is set on the edit level list.

If the switch level=F is attained at a certain time of step F206, it is regarded that an end point of the switch level list is found and in this case, the processing proceeds to step F210, in which the time code TCi is substituted as it is as the shift time code TCSi.

That is, the time code value of "02:00:00:00" corresponding to the index number "18" in FIG. 15 corresponds to the above value.

Next, at step F211, the edit level ELi="F" is attained and at step F212, the edit level ELi and the shift time code TCSi are transferred to the hard disk drive 15a as a final line data and recorded therein.

By the above processing, the edit level list shown in FIG. 15(b) is automatically produced from the switch level list shown in FIG. 15(a).

<7. Example of Edit List Processing in Automatic Editing Action>

An action of automatically producing an edit list further after the edit level list has been automatically generated as described above will be described.

In this edit list production processing, for the edit level produced as described above, a check list for calculating an accumulated time of a case in which the on air level is all set to "0" or "1" or "2" is generated.

The operator can set the on air level at every edit index number with reference to this check list.

By comparing the set on air level with the edit level, whether or not "on air" is set for each edit list or each edit index number and the on air time and off time are accumulated. If the on air time exceeds a target broadcasting time or does not reach it, for a portion instructed to be partially extracted, an extraction thereof by a required time interval is carried out or the on air level is changed so as to carry out an edition corresponding to the target time.

Figure 19:
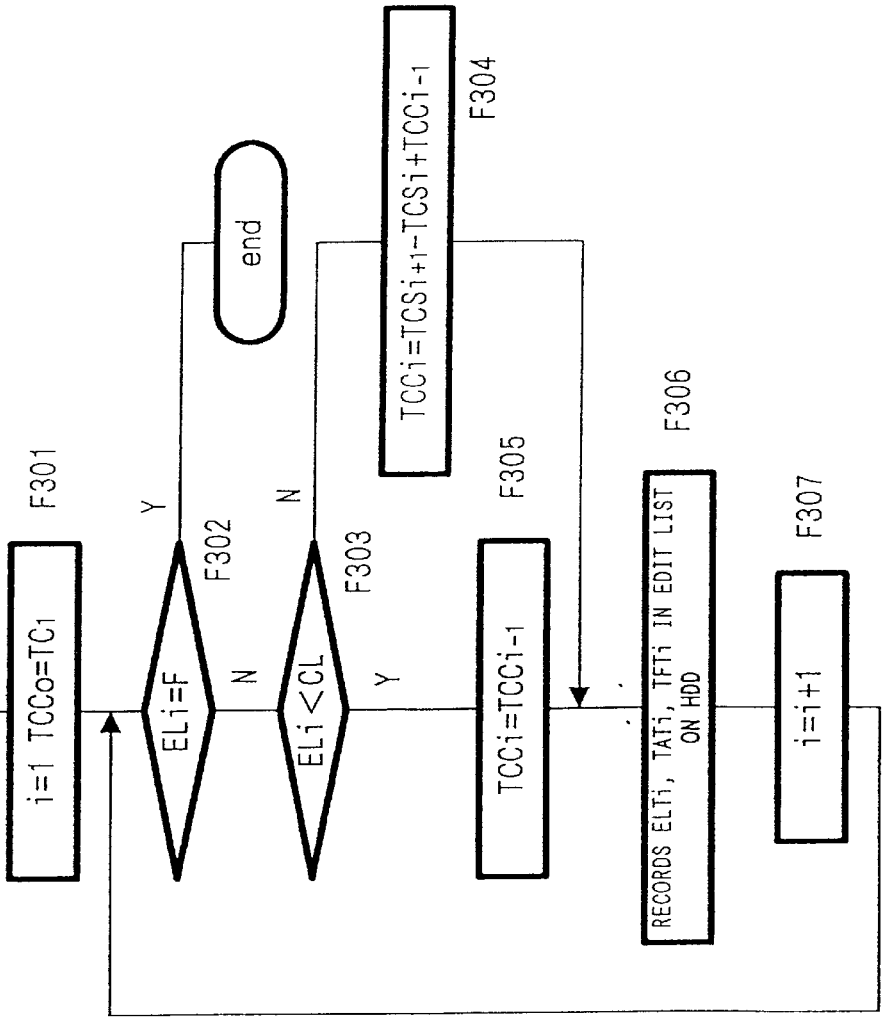
FIG. 19 is a flow chart of check list automatic production processing.

Referring to FIGS. 16 and 19, the check list production action will be described.

FIG. 16 shows a check list produced according to the edit level list produced in the above manner, adjacent to that edit level list.

As this check list, in each line of the level 0–2, three lists indicating accumulation times when the on-air level is all "0", "1" or "2" are formed.

The accumulation time when the on air level is all "0" is an accumulation time of intervals whose edit level is over "0". In the example shown in FIG. 16, this is an accumulation time of all the intervals of the index numbers "1"–"16". In this case, the accumulation time is "02:00:00:00" which is over an hour 30 minutes.

The accumulation time when the on air level is all "1" is an accumulation time of intervals whose edit level is over "1". In the example shown in FIG. 16, this is an accumulation time of the interval except the intervals of the index numbers "4", "8" and "12". In this example, the accumulation time is "01:36:30:00" which is slightly over "01:30:00:00" which is the target edit time length.

The accumulation time when the on air level is all "2" is an accumulation time of intervals whose edit level is over "2". In the example shown in FIG. 16, this is an accumulation time of the intervals of the index numbers "2", "6", "10" and "14". In this example, the accumulation time is "00:53:00:00" which does not reach the "01:30:00:00" which is the target edit time length.

A processing for producing such a check list is shown in FIG. 19. By carrying out the processing of FIG. 19 for each of the levels 0–2 as the check list, a check list shown in FIG. 16 is produced. First, when generating the check list of the level 0, it is assumed that check level CL=0.

First, at the step F301, the variable i corresponding to the index number is set to 1 and the time code TC1 is substituted for the check list total time TCC0.

Next at step F302, whether or not the edit level ELi=F or whether or not processing up to the final line has been carried out is determined. Unless it is "F", the processing proceeds to step F303. Then, whether or not the edit level ELi is less than check level CL is determined. If the edit level ELi is over the check level CL, the processing proceeds to step F304. Here, for the check list total time TCCi, a time of the edit index number or shift time code TCS i+1) of the next edit index number minus the shift time code TCSi of the current edit index number is added to the check list total time Tcc(i−1).

First when the variable i=1, the check list total time TCC(i−1) up to now is TCC0="00:00:00:00", the next edit index number shift time code TCSi+1) is TCS2="00:05:00:00" and the current edit index number shift time code TCSi is TSC1="00:00:00:00", thus the check list total time TCCi is TCC1="00:05:00:00".

On the other hand, if at step F303, it is determined that the edit level ELi is less than the check level CL, the processing proceeds to step F305, so that the last edit index number check list total time TCC(i−1) as it is the current check list total time TCCi value. That is, no addition is performed for the total time.

The check list total time TCCi calculated at step F304 or F305 is transferred to the local hard disk drive 15a at step F306 and recorded as check list data of the edit index number "i". Then, the variable i is incremented at step F307 and the processing is returned to step F302 so as to continue the same processing.

Then, when edit level ELi=F, the processing is terminated, that is, a single check list at that time is produced.

By carrying out such a processing by changing the setting to CL=0, CL=1 and CL=2, three check lists of level 0, level 1, and level 2 are formed as shown in FIG. 16. That is, the accumulation time of intervals selected each on air level is calculated.

By referring to the thus generated check list shown in FIG. 16, in which the on air level "1" is basically used while partially the on air level "2" is used, the edit of an hour and 30 minutes can be performed.

For the edit of an hour and 30 minutes, as shown in FIG. 16, it is assumed that only an interval displayed by the edit index numbers "5"–"7" is set to the on air level "2" and other intervals are set the on air level to "1". That is, about the interval displayed by the edit index numbers "5"–"7", only the interval in which the edit level is over "2" is selected as an on air portion and in other intervals of the edit index number, only an interval in which the edit level is over "1" is selected as an on air portion.

Depending on such an on air level setting, the edit list, the on air time and the off time are calculated (this calculating processing will be described later). In this case, intervals represented by the edit index numbers "1", "2", "3", "6", "9", "10", "11", "13", "14" and "15" as the edit list are selected as the "on air".

However, the accumulation time of the on air time is "01:18:00:00", which does not reach a target time "01:30:00:00" shown in the outside of the bottom.

In this case, to compensate for the short time, an edit for extracting only a necessary time amount from a required time interval is carried out.

For example, an example of edition in which only a necessary time amount is extracted from an interval of the edit index number "7" is shown in FIGS. 17 and 18.

In the example of FIG. 17, the interval of the edit index number "7", which is the on air level "2" in FIG. 16 is changed to "T".

The on air level "T" means extracting a required time interval from the head of that interval for on air.

That is, if the operator sets the on air level "T", the required time interval is automatically extracted from the head of the interval as the on air portion.

In FIG. 16, the target time is "01:30:00:00" and the accumulation time of the on air time is "01:18:00:00", so that 12 minutes is short.

Therefore, if the on air level "T" is set in the interval of the edit index number "7" as shown in FIG. 17, 12 minutes portion is selected from the starting time (time code "00:55:00:00") for on air portion. In this case, a portion from "00:55:00:00" to "01:07:00:00" in time code is extracted.

Correspondingly, in the edit list shown in FIG. 17, an end point of the extracted portion of the interval of the index number "7" is expressed with the letter "E" indicating an end as "01:07:00:00".

By extracting a required time interval from a former half of an interval displayed by a certain edit index number, as evident from the on air time, the accumulation time becomes "01:30:00:00", which coincides with the target time "01:30:00: 00".

Next, in an example shown in FIG. 18, the interval of the edit index number "7", which is the on air level "2" in FIG. 16 has been changed to "R".

The on air level "R" means shifting the head of that interval backward up to the end point of the interval so as to extract the required time portion only and broadcast it.

That is, if the operator sets the on air level "R", a required time portion is automatically extracted as the backward portion as the on air portion.

In the state shown in FIG. 16, as described above, a portion of 12 minutes is short.

Thus, if the on air level "R" is set in the interval of the edit index number "7" as shown in FIG. 18, a portion 12 minutes long with its end time (time code "01:11:00:00" of the edit index number "8") as an end point is selected for the on air. In this case, in the interval of the edit index number "7", a start point for that extraction is set and a portion from time code "00:59:00:00" to "01:10:59:29" is extracted.

Correspondingly, in the edit list shown in FIG. 18, a beginning point of the extraction interval of the edit index number "7" is expressed by the letter "S" as "00:59:00:00".

By extracting a required time interval as a latter half portion of an interval shown by a certain edit index number, the accumulation time becomes "01:30:00:00" as evident from the on air time, which is coincident with the target time "01:30:00:00".

Figure 20:
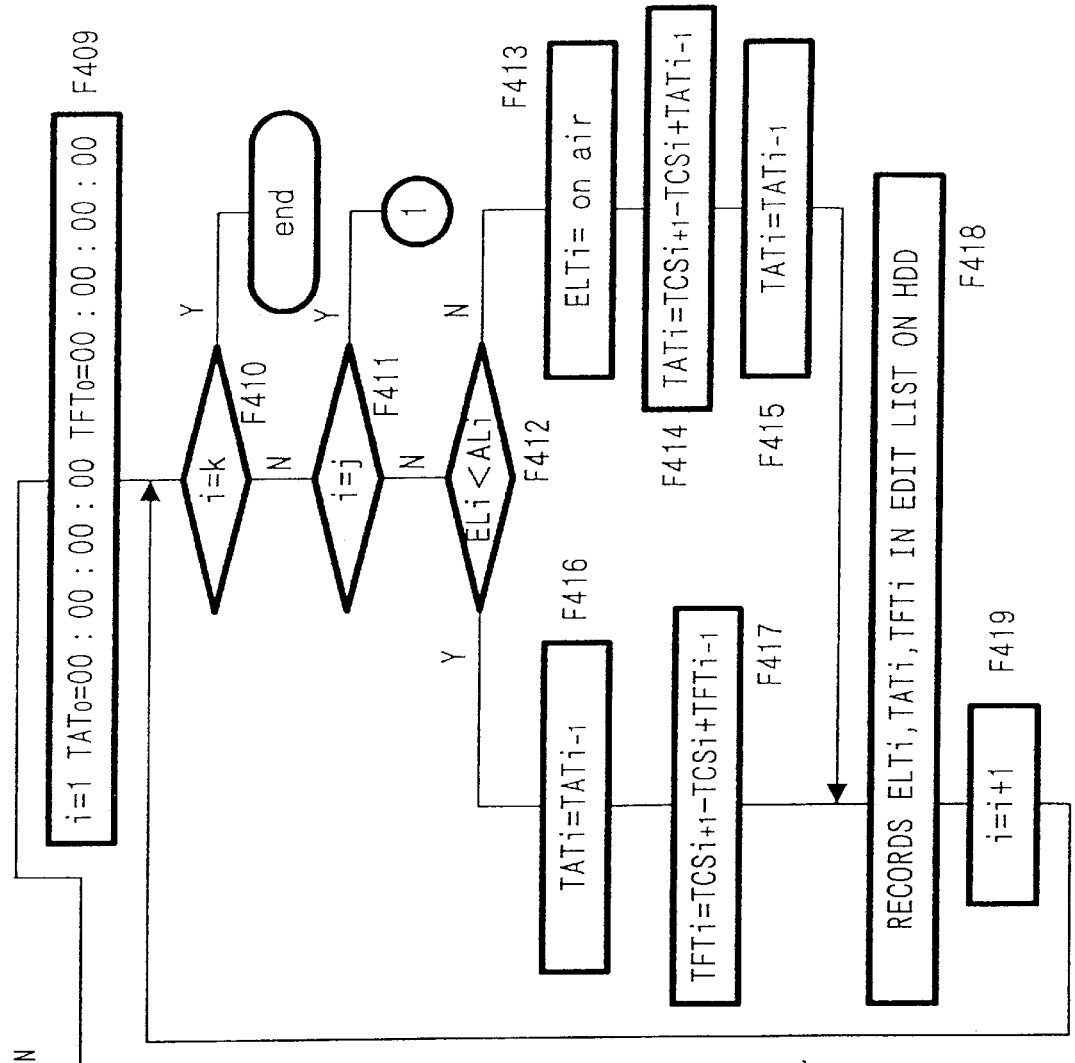
FIGS. 20 and 21 are respectively flow charts of the edit list automatic production processing.
Figure 21:
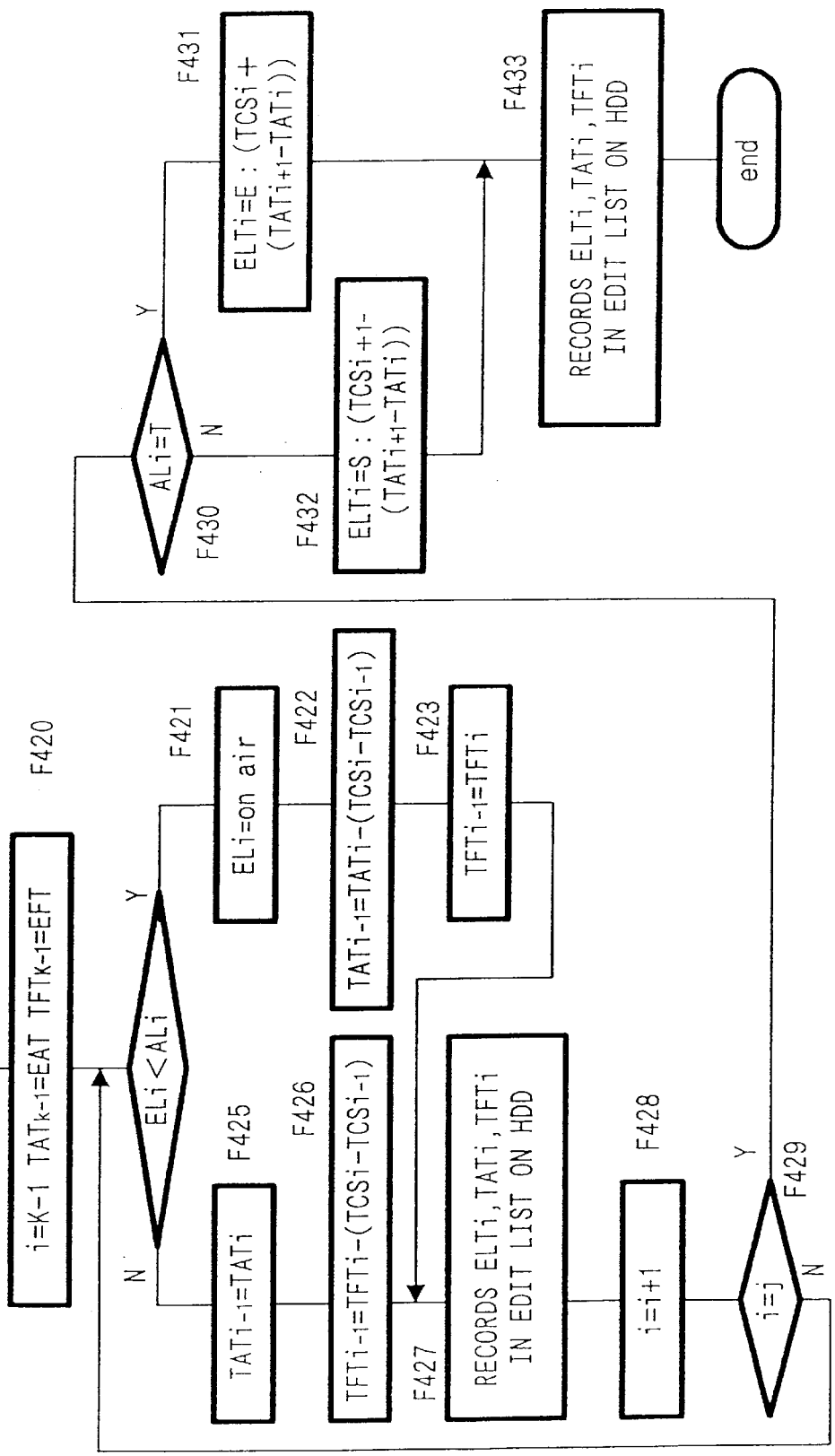

FIGS. 20 and 21 show processing of the CPU 10 for generating an edit list based on the edit level list and the on air level as shown in FIGS. 16–18.

First, at step F401, the variable i corresponding to the edit index number is set to 0. Further, the variable j corresponding to the edit index number "T" or "R" on the on air level is set to 0. The variable k corresponding to the edit index number (or the edit index number of the edit level "F") at a final line of the edit list is set to 0.

Processing for setting the variables j and k is carried out at steps F402, F403, F405, and F406.

Namely at step F402, while the variable i is being incremented, at step F403, whether or not the on air level ALi is set to "T" or "R" is verified. If it is "T" or "R", a value of the variable i at that time is substituted for the variable j at step F404.

At step F405, whether or not the edit level ELi is F is verified. That is, this processing is processing for verifying whether the increment of the variable i has reached the final line of the edit level list.

That is, in the loop from step F402 to F405, whether or not the on air level ALi is "T" or "R" is verified up to the final number of the edit index number. If the edit level ELi reaches F at a certain point of time, a value of the variable i at that time is substituted for the variable k at step F406.

For example, in the state of the edit level list and the on air level shown in FIG. 16, the variable j is 0 and the variable k is 16 as a result of the above processing. Depending on the state of the edit level list and the on air level shown in FIGS. 17 or 18, the variable j is 7 and the variable k is 16.

Then, at step F407, whether or not there is an interval in which the variable j is 0 or the on air level ALi is set to "T." or "R" is verified. If there is not such an interval while the variable j is set to 0, the variable j is set to k at step F408. Namely, in the case of FIG. 16, the variable j is set to 16. Then, the processing proceeds to step F409.

If there is an interval in which the on air level ALi is set to "T" or "R", the processing proceeds from step F407 to F409.

At step F409, the variable i is set to 1 and the initial value TAT0 of the on air total time TATi is set to 00:00:00:00 and the initial value TFT0 of the off total time TFTi is set to 00:00:00:00. Since then, at step F419, while the variable i is being incremented, at step F410, the variable i is set to k and then the processings of steps F410–F419 are carried out until the processing of the final line is terminated.

At step F411, if the variable i is j or there is an interval in which the on air level ALi is set to "T" or "R" and further the processing reaches the edit index number in the interval of "T" or "R" with the incremental of the variable i, the processing proceeds to step F420–F433 of FIG. 21.

Processing of steps F412–F419 in a case when there is no interval in which the on air level ALi is set to "T" or "R" will be described below.

At step F412, the edit level ELi and the on air level ALi are compared with each other. If the edit level ELi is over the on air level ALi, an interval represented by that edit index number is selected as an on air portion. Then, the processing proceeds to step F413 and the edit list ELTi data is set to the "on air".

At step F414, for the on air total time TATi, the time of the edit index number or next edit index number shift time code TCS i+1) minus the current edit index number shift time code TCSi is added to the on air total time TAT(i–1) up to that time.

At step F415, the off time TATi processing is carried out. In this case, because the "on air" interval is treated, off total time TATi is not summed, and therefore in the processing of step F415, the off total time TAT(i–1) of last edit index number is current off total time TATI value.

Then, the processing proceeds to step F418 and the edit list ELTi, on air total time TATi and off total time TATi calculated at steps F413, F414 and F415 are transferred to the local hard disk drive 15a and recorded as list data of the line "i" in the edit index number. Then, at step F419, the variable i is incremented and the processing is returned to step F410.

For example when the variable i is 1 or in a processing corresponding to the edit index number "1" in FIG. 16, the on air level is "1" and the edit level is "1", so that the edit list says the "on air". Further, because the on air total time TAT(i–1) up to that time is TAT0 or "00:00:00:00", the next edit index number time code TCSi+1) is TCS2 or "00: 05:00:00" and the current edit index number shift time code TCSi is TCS1 or "00:00:00:00", the on air total time TATi is TAT1 or "00:05:00:00".

Because the off total time TFT0 value is substituted as the off total time TFT1, the off total time TFT1 is "00:00: 00:00".

This becomes data of the edit list, the on air time and the off time on a line "1" in edit index number shown in FIG.16.

On the other hand, if it is determined that the edit level ELi is less than the on air level ALi at step F412, an interval of that edit index number is not selected for the on air.

Therefore, the processing proceeds to step F416, in which the on air time TAT (i–1) of last edit index number is applied as it is as the current on air total time TATi value. That is, addition as the on air total time is not carried out.

Because the off time addition is carried out in this case, at step F417, for the off total time TFTi, the time of the edit index number or next edit index number shift time code TCSi+1) minus the current edit index number shift time code CSi is added to the off total time TFT(i–1) up to that time.

Then, the processing proceeds to step F418, in which the on air total time TATi and the off total time TFTi calculated at steps F416, F417 and the edit list ELTi data assumed as blank data are transferred to the local hard disk drive 15a and recorded as list data on a line "i" of the edit index number. Then, at step F419, the variable i is incremented and the processing is returned to step F410.

For example when the variable i is 4 in FIG. 16, that is, in a processing corresponding to the edit index number "4", the on air level is "1" and the edit level is "0". Thus, the edit list is blank. Further, because the off total time TFT(i–1) up to that time is TFT3 or "00:00:00:00", the next edit index number time code TCS i+1) is TCS5 or "00:40:30:00" and the current edit index number shift time code TCSi is TCS4 or "00: 31:30:00", then the off total time TFTi is TAT4 of "00:09:00:00".

For the on air total time TAT4, the on air total time TAT3 is substituted, and therefore, the on air total time TAT4 is "00:31:30:00".

This is data of the edit list, the on air time and the off time on a line "4" of the edit index number of FIG. 16.

By repeating the above procedure until the variable i becomes k at step F410 or the edit index number is 16 in an example of FIG. 16, the list shown in FIG. 16 is formed.

By the way, if there is an interval in which the on air level ALi is set to "T" or "R" as shown in FIG. 17 or 18, the processing of FIG. 21 is carried out as a processing after the line "T" or "R".

That is, in the case of FIG. 17 or 18, because the variable j is 7, the edit list data relating to lines "1"–"6" of edit index number are generated by processing of steps F412–F419 of FIG. 20. When the variable i becomes 7, the processing proceeds from step F411 to step F420 of FIG. 21.

At step F420, the variable i is set to k–1 and the value of the on air total time TAT(k–1) is set to EAT. The EAT refers to a specified broadcasting time value or 1 hour 30 minutes (=01:30:00:00) in this case. The off total time TFT (k–1) value is set to EFT. The ETF refers to a time value to be cut out by the edition or 30 minutes in this case (=00:30:00: 00).

Because the variable k is 16 in this example, the variable i is 15, the on air total time TAT15 is 01:30:00:00 and the off total time TFT15 is 00:30:00:00 at step F420.

At step F428, the decrement of the variable i is being carried out and processing of steps F421–F428 is carried out until the variable i is j at step F429. That is, in this processing, each list data is calculated in reverse direction up to the line where the on air level ALi is "T" or "R" from the final line forming the list.

At step F421, the edit level ELi and the on air level ALi are compared with each other. If the edit level ELi is over the on air level ALi, an interval represented by that edit index number is selected as an on air portion. Then, the processing proceeds to step F422, in which the edit list ELTi data is set to the "on air".

At step F423, for the on air total time TAT(i–1) of a line precedent in terms of broadcasting time, the time of edit index number just before or the current edit index number shift time code TCSI minus the shift time code TCS(i–1) of edit index number just before in terms of broadcasting time is subtracted from the on air total time TATI of that edit index number.

At step F424, processing for the off total time TFTi is carried out. In this case, because this is not an interval to be "on air", the addition of off total time TFTi is not carried out. That is, the off time just before become the same value as the off time of the current line. Therefore, for the off total time TFT(i−1) of last edit index number, a value of the off total time TFTi of this time is substituted.

Then, the processing proceeds to step F427, in which the data of edit list ELTi generated at step F422, the on air total time TATi secured at that time and the off total time TFTi are transferred to the local hard disk drive 15a and recorded as list data of a line "i" of the edit index number. The values of the on air total time TATi and the off total time TFTi are formed at steps F423, F424 corresponding to i+1) with respect to the variable i of that time.

At step F428, the variable i is decremented and the processing is returned to step F421.

For example, when the variable i is 14 in FIG. 18, that is, in a processing corresponding to the edit index number "14" the on air level is "1" and the edit level is "2", and therefore the edit list is set to "on air".

The on air total time TAT14 at the edit index number "14" is calculated when the variable i is 15. This is the on air total time TAT15(=01:30:00:00) minus the time of the edit index number "14", and therefore the on air total time TAT14 is "01:28:00:00".

For the off total time TFT14, a value of the off total time TFT15 is substituted. Thus, the off total time TFT14 is "00:30:00:00".

This is data of the edit list, the on air time and the off time on a line "14" in the edit index number of FIG. 18.

On the other hand, if it is determined that the edit level ELi is less than the on air level ALi at step F421, an interval of that edit index number is not selected for the on air.

Thus, the processing proceeds to step F425. For the on air total time TAT(i−1) of an edit index number of a line just before in terms of broadcasting time, a value of the on air total time TATi of this time is substituted.

In this case, the addition of the off time is carried out, and therefore at step F426, for the off total time TFT(i−1) of edit index number of a line just before, the time of current edit index number or the shift time code TCSi of current edit index number minus the shift time code TCSi of edit index number (i−1) just before is subtracted from the off total time TFTi.

Then, the processing proceeds to step F427, in which data of the edit list ELTi assumed to be blank data, the on air total time TATi secured at that time and the off total time TFTi are transferred to the local hard disk drive 15a and recorded as list data of a line "i" of edit index number. Values of the on air total time TATi and the off total time TFTi are formed at steps F425 and F426 corresponding to i+1) with respect to the variable i of that time.

At step F428, the variable i is decremented and the processing is returned to step F421.

For example, when the variable i is 12 in FIG. 18 or in a processing corresponding to the edit index number "12", the on air level is "1" and the edit level is "0", and therefore this is treated as blank in the edit list. Further, at this time, the off total time TFT11 at the edit index number "11" is calculated. Here, the time of the interval of the edit index number "12" is subtracted from the off total time TFT12 (=00: 30:00:00), and therefore the off total time TFT11 is "00:19:30: 00". Further, because for the on air total time TAT11, a value of the on air total time TAT12 is substituted, the on air total time TAT11 is "01:12:00:00".

This is data for the edit list of a line "12" of the edit index number and the on air time and the off time of a line "11" of the edit index number in FIG. 16.

The above processing is repeated until the variable i becomes j at step F429, that is, the edit index number is 7 in an example of FIG. 17 or 18.

Then, the processing proceeds from step F429 to step 430, in which processing of an interval in which on air level ALi is set to "T" or "R" is carried out.

At step F430, which the on air level of line "i" with the edit index number is "T" or "R" is determined.

If the on air level is "T", the processing proceeds to step F431. This is like an example of FIG. 17. At this time, as data of the edit level ELTi, with the character "E", an end point of extraction portion of an interval of the edit index number "7" is calculated. That is, a short time is calculated by (on air total time TATi+1)) minus (on air total time TATi) and then that short time is added to the shift time code TCSi of line "i" of edit index number. That is, the shift time code TCSi is a beginning point of the extraction portion and, the value obtained by adding the short time to this value becomes, an end point of that extraction portion.

On the other hand, if the on air level of line "i" of edit index number is "R", the processing proceeds to step F432. This is like an example of FIG. 18. At this time, as data of the edit level ELTi, with the character "S", a beginning point of extraction portion of an interval of the edit index number "7" is calculated. That is, a short time is calculated by (on air total time TATi+1)) minus (on air total time TATi). This short time is subtracted from the shift time code TCSi of line "i+1" of edit index number. Namely, the shift time code TCS(i+1) is an end point of the extraction portion and, the value obtained by subtracting the short time from this value becomes, a beginning point of that extraction portion.

In the above manner, the edit list data of line "i" which the edit index number is formed. On air total time TATi of line "i" in edit index number, calculated at steps F423, F424 or steps F425, F426 and off total time TFTi are transferred to the local hard disk drive 15a and recorded as list data of line "i" in edit index number.

If the above processing is terminated, the list as shown in FIG. 17 or 18 is formed.

<8. On-air Processing>

An actual on air processing based on the edit list generated in the above manner will be described with reference to FIG. 22. That is, the computer system 1 generates a reproduction command for the hard disk array 2 using the edit list.

First, at step F501, data of the edit list ELTi line, data of the edit level ELi line and data of the shift time code TCSi are read out from the edit list data recorded in the local hard disk drive 15a.

At step F502, the variable i is set to 1 and then at step F510, while the variable i is being incremented the processing of steps F504–F509 is carried out until the edit level ELi is F at step F503 or it is determined that processing corresponding to a final line of the edit list has been terminated.

That is, from the line "1" of edit index number, the edit list ELTi of each line is verified in sequence and a corresponding reproduction command is generated.

Because a line designated as "on air" on the edit list ELTi or an interval from the shift time code TCSi is an interval to be broadcast, the processing proceeds from step F504 to step F505 and a reproduction command is outputted so as to reproduce video data from the shift time code TCSi to the shift time code TCSi+1) as all of that interval.

An interval which is designated as "S" on the edit list ELTi and in which the start time code ST is recorded corresponds to an interval "7" with the edit index number of FIG. 18. This interval is reproduced by extracting a portion after the start time code ST. Thus, the processing proceeds from step F506 to step F507, in which a reproduction command so as to reproduce video data from the start time code ST to the shift time code TCSi+1) is outputted.

An interval which is designated as "E" on the edit list ELTi and in which the end time code ET is recorded corresponds to the interval "7" with the edit index number of FIG. 17. Thus, this is an interval to be reproduced by extracting up to the end time code ET. Thus, the processing proceeds from step F508 to F509, in which a reproduction command so as to reproduce video data from the shift time code TCSi to the end time code ET is outputted.

Figure 22:
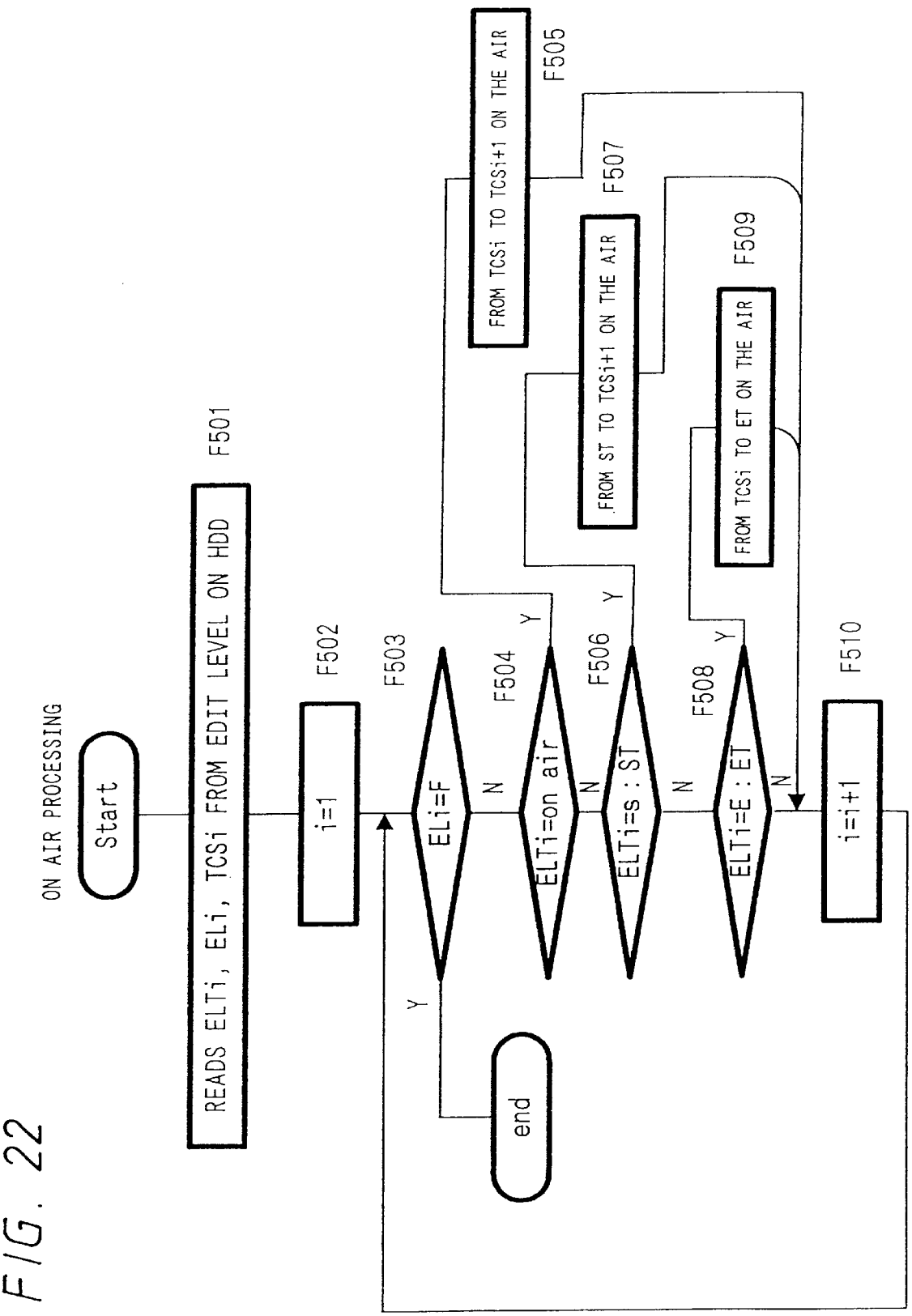
FIG. 22 is a flow chart of on air processing.

By the processing shown in FIG. 22, reproduction action is carried out in the hard disk array 2 corresponding to the edit list. For example, based on a result of the edition shown in FIG. 17 or 18, broadcasting of an hour 30 minutes is carried out from 2-hour recorded video data.

<9. Example of Edit List Processing During Broadcasting in Automatic Editing Action>

In the case of time shift recorded program broadcasting it is necessary that while taken-out, pictures are recorded in the hard disk array 2, the pictures are edited and outputted for broadcasting. Further, there is a case where after broadcasting has been started, the program must be edited so as to broadcast the optimism contents within the broadcasting time.

If the check list or edit list is generated after broadcasting has been already started, it is necessary to carry out processing considering a portion already broadcast.

FIG. 23 shows a case in which an interval of edit index number "5" designated by the black frame is currently being on air.

On the top row of the edit list, length of already broadcast video data is represented. That is, the length of broadcast time is shown on the top row of the on air time and length of cut time is displayed on the top row of the off time.

The check list is verified by not the aforementioned check level in terms of intervals already broadcast, but the on air level.

That is, for any row of the "level 0", "level 1" and "level 2" of the check list, about the edit index numbers "1"–"4", the on air level and the edit level are compared and then total time is calculated.

About an interval currently on air also, the on air level and the edit level are compared so as to calculate the total time. If the edit level is smaller than the check level, only a broadcast portion within that interval is added as the total time.

About the line "5" of the edit index number, the edit level is "1" and the on air level is "1". For columns of the "level 0" (check level=0) and the "level 1" (check level=1) on the check list, the time amount of the edit index number "5" is added so that "00:34:00:00" is attained.

About the column of "level 2" (check level=2), because the edit level is less than the check level, only a portion already broadcast in that interval is added so that "00:34:15:20" is attained.

FIG. 25 shows processing for producing a check list after broadcasting is started.

First at step F601, the variable i corresponding to the index number is set to 1 and then the time code TC1 or "00:00:00:00" is substituted for the check list total time TCC0.

At steps F602 and F604, which the shift time code TCSi is before or after the on air timing AT is determined. The on air timing AT is a time code value currently being on air.

In an example of FIG. 23, when the variable i is "1"–"4", at step F602, a negative result is obtained. At step F603, if the on air level ALi is over the edit level ELi (that is, being broadcast), the processing proceeds to step F610, in which for the check total time TCCi, the time of the edit index number or the value of next edit index number shift time code TCS(i+1) minus the current edit index number shift time code TCSi is added to the check list total time TCC (i–1) up to that time. on the other hand, if it is determined that the edit level ELi is less than the on air level ALi at step F603, the processing proceeds to step F608, in which the check list total time TCC(i–1) of last edit index number is, as it is, set to the value of the check list total time TCCi of this time. That is, no addition as the total time is carried out.

The check list total time TCCi calculated at step F610 or F608 is transferred to the local hard disk drive 15a at step F611 and recorded as check list data for the line "i" of edit index number. Then, at step F612, the variable i is incremented and the processing is returned to step F602, to carry out the same processing.

In an example of FIG. 23, when the variable i is 5, an affirmative result is obtained at step F602, however a negative result is obtained at step F604. Thus, the edit level ELi and the check level CL are compared at step F605.

If processing of "level 0" (check level CL=0) or "level 1" (check level CL=1) of the check list of FIG. 23 is carried out, a negative result is obtained at step F605D. Thus, the processing proceeds to step F610, in which for the check list total time TCCi, time of the edit index number or the value of the next edit index number shift time code TCS(i+1) minus the current edit index number shift time code TCSi is added to the check list total time TCC(i–1) up to that time.

If processing of "level 2" (check level CL=2) of the check list of FIG. 23 is carried out, an affirmative result is obtained at step F605 and therefore the processing proceeds to step F609, in which for the check list total time TCCi, already on air time in the edit index number interval or on the value obtained by subtracting from the air timing AT minus current edit index number shift time code TCSi is added to the check list total time TCC(i–1).

The check list total time TCCi calculated at step F610 or F609 is transferred to the local hard disk drive 15a at step F611 and recorded as check list data of the line "i" of the edit index number. Then, the variable i is incremented at step F612 and the processing is returned to step F602, in which the same processing is carried out.

In the example of FIG. 23, after the variable of "6", an affirmative result is obtained at steps F602, F606. Then, until the variable i is "16" and an affirmative result is obtained at step F606, the edit level ELi and the check level CL are compared at step F607.

If the edit level ELi is over the check level CL, the processing proceeds to step F610, in which addition for the check list total time TCCi is carried out.

On the other hand, if the edit level ELi is less than the check level CL, the processing proceeds to step F608 in which addition for the check list total time TCCi is not carried out.

The check list total time TCCi calculated at step F610 or F608 is transferred to the local hard disk drive 15a at step F611 and recorded as check list data of the line "i" of the edit index number.

This processing is continued until an affirmative result is obtained at step F606, so that a check list shown in FIG. 23 is generated.

By carrying out the above processing by changing the setting of its check level to CL=0, CL=1 or CL=2, three check lists of level 0, level 1 and level 2 are formed as shown in FIG. 23. That is, considering the current on air level AL, an accumulation time of intervals selected as the on air level is calculated.

As regards the edition after broadcasting is started, the interval in which the on air level is to be set referring to the check list is restricted to an interval after the on air timing.

Based on the check list produced in the above manner corresponding to broadcasting up to the on air timing, subsequent broadcasting time portion is edited appropriately and its edit list is produced.

In FIG. 23, for subsequent portion or in an interval after the edit index number "6", the edit index number "7" is set to the on air level "2" and the other numbers are set to the on air level "1".

Based on such an on air level setting, the on air level and the edit level are compared. By the processing of FIG. 20, the edit list, the on air time and the off time are calculated. As a result, the list shown in FIG. 23 is formed.

In the list of FIG. 23, the total of the on air time is "01:20:30:00", which has not reached a target edit time of "01:30:00:00".

Thus, the processings described with reference to FIGS. 17 and 18 are required to match the time. As shown in FIG. 24 for example, the on air level of the edit index number "7" is changed from "2" to "R". Then, by the processing of FIGS. 20 and 21, the edit list, the on air time and the off time are newly calculated and the values shown in FIG. 24 are obtained. That is, in an interval of the edit index number "7", a portion from "01:01:30:00" to "01:10:59:29" is extracted and added as an on air portion, so that the on air time is "01:30: 00:00".

Like this, if the edit list is produced, the computer system 1 generates a reproduction command for the hard disk array 2 based the list and carries out broadcasting according to a result of the edition.

In the case of FIG. 23, because the interval up to the edit index number "5" has been broadcasted, the reproduction control based on this edit list is carried out for portions subsequent to the edit index number "6".

As described above, the present invention comprises an importance degree value input means capable of inputting an importance degree value indicating the importance degree of the content of soft video data arbitrarily and an importance degree value recording means for recording the importance degree value inputted by the importance degree value input means with time information generated by a time information generating means in a recording medium. For video data to be recorded, as the operator inputs the importance degree value corresponding to the content of each scene, information about the importance degree of each scene is held.

Further, there is provided a changing means capable of changing the values of the importance degree and time information recorded in the importance degree value recording means.

A control means for editing and broadcasting the video data recorded in the recording medium selects a time interval to be reproduced from the video data recorded in the recording medium, based on the edit list information generated according to the importance degree value and time information recorded in the importance degree value recording means and then a video data record reproduction means reproduces and outputs broadcasting video data.

Therefore, without checking already recorded pictures, video data can be edited optimally corresponding to the importance degree value, so that the video data can be broadcast corresponding to specified broadcasting time without missing any important scene, thereby making it possible to realize the most preferable broadcasting.

Although it is difficult to always set the importance degree values at preferred timing because the operator inputs it through the importance degree value input means at real time, because the importance degree value and/or time information can be changed by the changing means, it is possible to realize a preferred edition.

Further, the changing means is capable of changing time information value corresponding to each importance degree value depending on change of the importance degree value on the time axis, so that optimum change of the importance degree value can be automatically carried out. For example, as for a portion in which the importance degree value rises, the time information corresponding to that rising importance degree value is changed to a value of a time earlier by a predetermined time. That is, about important scenes, the importance degree value of a scene just before is raised. As a result, the automatic updating procedure for obtaining optimum importance degree value information is carried out, so that operator's editing work is facilitated.

The control means generates the edition list information corresponding to the importance degree value and time information recorded in the importance degree value recording means and calculates an accumulation time of the video data portions to be selected from the video data recorded in the recording medium, based on the importance degree value of the edit list information, thereby contributing to optimum setting, for example, setting of the on air level.

After broadcasting is started, the calculation of the accumulation time is carried out according to the accumulation time of video data already reproduced and outputted and the accumulation time of the video data which will be selected based on the importance degree value of the edit list information but has not been reproduced and outputted. Thus, it is possible to optimally edit non-edited portion corresponding to the remaining broadcasting time.

A selection standard (e.g., on air level) for the control means to select a broadcasting video data based on the importance degree value of the edit list information can be set to an arbitrary value for each of any interval (e.g., edit index number) of the video data. Thus, flexible edition corresponding to broadcasting time and importance degree can be carried out.

Further, the accumulation time of the video data portion to be selected based on the selection standard and the importance degree value edit list information at every interval can be calculated. Thus, optimum edition can be carried out simply.

Depending on the settings of a target accumulation time and an interval to be corrected, the control means can extract only a required time portion as broadcasting video data for that portion to be corrected. Thus, the total time of a result of edition can be strictly adjusted to a predetermined broadcasting time easily.

The embodiment of the edition apparatus of the present invention has been described above, however, the edition apparatus of the present invention is not restricted to the structure and processing system described above but various modifications can be made.

What is claimed is:

1. An editing apparatus, being characterized by comprising:

time information generating means for generating time information of a source video data supplied continuously from an outside at a real time;

video data record reproduction means capable of recording said source video data in a recording medium together with the said time information and reproducing video data recorded in the recording medium corresponding to a reproduction command;

importance degree value input means capable of inputting an importance degree value indicating an importance degree of the content of said source video data arbitrarily;

importance degree value recording means for recording the importance degree value inputted by said importance degree value input means in the recording medium together with the time information generated from said time information generating means;

changing means capable of changing values of the importance degree value and/or time information recorded in said importance degree value recording means; and control means selecting a time portion to be reproduced from video data recorded in said recording medium based on edit list information generated corresponding to the importance degree value and time information recorded in said importance degree value recording means and making said video data record reproduction means to reproduce and output broadcasting video data.

2. An editing apparatus according to claim 1, being characterized in that said changing means can change a value of time information corresponding to each importance degree value depending on a change of the importance degree value on a time axis.

3. An editing apparatus according to claim 2, being characterized in that if of a first importance degree value corresponding to time information earlier on the time axis and a second importance degree value corresponding to its next time information, said second importance degree value indicates a larger importance degree value than said first importance degree value, said changing means changes the time information corresponding to said second importance degree value to a value of time earlier by a predetermined time amount.

4. An editing apparatus according to claim 1, being characterized in that said control means generates edit list information corresponding to the importance degree value and time information recorded in said importance degree value recording means and calculates an accumulation time of video data portions to be selected according to the importance degree values of the edit list information from video data recorded in said recording medium.

5. An editing apparatus according to claim 4, being characterized in that after reproduction of broadcasting video data from said recording medium by said video data record reproduction means is started, said accumulation time by said control means is calculated by using an accumulation time of video data already reproduced and outputted and an accumulation time of video data which will be selected based on the importance degree value of the edit list information but has not been reproduced and outputted.

6. An editing apparatus according to claim 4, being characterized in that a selection standard value for said control means to select broadcasting video data based on the importance degree value of the edit list information can be set to an arbitrary value at every arbitrary interval of the video data and said control means calculates an accumulation time of video data portion to be selected based on the selection standard value and an importance degree value of edit list information of each interval.

7. An editing apparatus according to claim 4, being characterized in that in accordance with a setting of a target accumulation time and a setting of an interval to be corrected, said control means selects only a required time portion as broadcasting video data for said portion to be corrected.

8. An editing method being characterized in that:

time information of a source video data supplied continuously from an outside at a real time i s generated;

said source video data is recorded in a recording medium together with said time information, and said source video data recorded in said recording medium is reproduced and outputted corresponding to a reproduction command;

an importance degree value indicating an importance degree of contents of said source video data is arbitrarily inputted, and the inputted importance degree value is recorded in said recording medium together with said time information;

values of the importance degree value and/or time information recorded thereafter are updated; and a time portion to be reproduced is selected from source video data recorded in said recording medium bas ed on edit list information generated corresponding to said recorded importance degree value and time information so as to obtain broadcasting video data.

9. An editing method according to claim 8, being characterized in that a value of time information corresponding to each importance degree value can be changed depending on a change of the importance degree value on a time axis.

10. An editing method according to claim 9, being characterized in that if of a first importance degree value corresponding to time information earlier on the time axis and a second importance degree value corresponding to next time information, said second importance degree value indicates a larger importance degree value than said first importance degree value, the time information corresponding to said second importance degree value is changed to a value of time earlier by a predetermined time amount.

11. An editing method according to claim 8, being characterized in that an edit list is generated corresponding to said recorded importance degree value and time information, and an accumulation time of video data portions to be selected on the basis of importance degree values of the edit list information is calculated from source video data recorded is said recording medium.

12. An editing method according to claim 11, being characterized in that after reproduction of broadcasting video data from said recording medium is started, said accumulation time is calculated by using an accumulation time of value broadcasting video data already reproduced and outputted and an accumulation time of source video data which will be selected based on the importance degree value of the edit list information but has not been reproduced and outputted.

13. An editing method according to claim 11, being characterized in that a selection standard value for selection of a broadcasting video data based on the importance degree value of the edit list information can be set to an arbitrary value at every arbitrary interval of the video data and a an accumulation time of video data portion to be selected based on the selection standard value and an importance degree value of an edit list information of each interval is calculated.

14. An editing method according to claim 11, being characterized in that in accordance with a setting of a target accumulation time and a setting of an interval to be corrected, only a required time amount is selected as broadcasting video data for said portion to be corrected.

15. In an editing system for editing source video data, the editing system being characterized by comprising:

editing point specifying means for specifying an editing point of said source video data and inputting an importance degree data indicating an importance degree of source video at said editing point;

editing list generating means for generating an editing list for specifying an edition interval of the source video data based on data indicating said editing point and said importance degree data; and editing means for generating final video program data from said source video data according to said editing list.

16. In an editing system according to claim 15, the editing system being characterized in that said editing list generating means generates said editing list so as to change a length of an editing interval of said source video data for use in said final video program according to a change of said importance degree data in a time axis direction.

17. In an editing system according to claim 15, the editing system being characterized in that said editing list generating means generates said editing list so that an interval in which said importance degree data exceeds a predetermined level is said editing interval of the source video data for use in said final video program.

18. In an editing method for editing source video data, the editing method being characterized in that when an edition operator inputs an editing point of source video data by operating a pointing device while watching an image of said source video data displayed on a computer display, and inputs an additional information for said editing point;

an editing list for specifying an editing interval of said source video data in generated on the basis of said editing point and said additional information; and a final video program data is generated from said source video data according to said editing list, wherein said additional information is importance degree data indicating an importance degree of said source video data at said editing point.

19. In an editing method for editing source video, the editing method being characterized in that when an edition operator inputs an editing point of source video data by operating a pointing device while watching an image of said source video data displayed on a computer display, and inputs an additional information for said editing point;

an editing list for specifying an editing interval of said source video data in generated on the basis of said editing point and said additional information; and a final video program data is generated from said source video data according to said editing list, wherein said editing list is generated so as to change a length of an editing interval of said source video data for use in said final video program according to a change of importance degree data in a time axis direction.

20. In an editing method for editing source video data, the editing method being characterized in that when an edition operator inputs an editing point of source video data by operating a pointing device while watching an image of said source video data displayed on a computer display, and inputs an additional information for said editing point;

an editing list for specifying an editing interval of said source video data in generated on the basis of said editing point and said additional information; and a final video program data is generated from said source video data according to said editing list, wherein said editing list is generated so that an interval in which importance degree data exceeds a predetermined level is said editing interval of the source video data for use in said final video program.

* * * * *